March 2, 1965

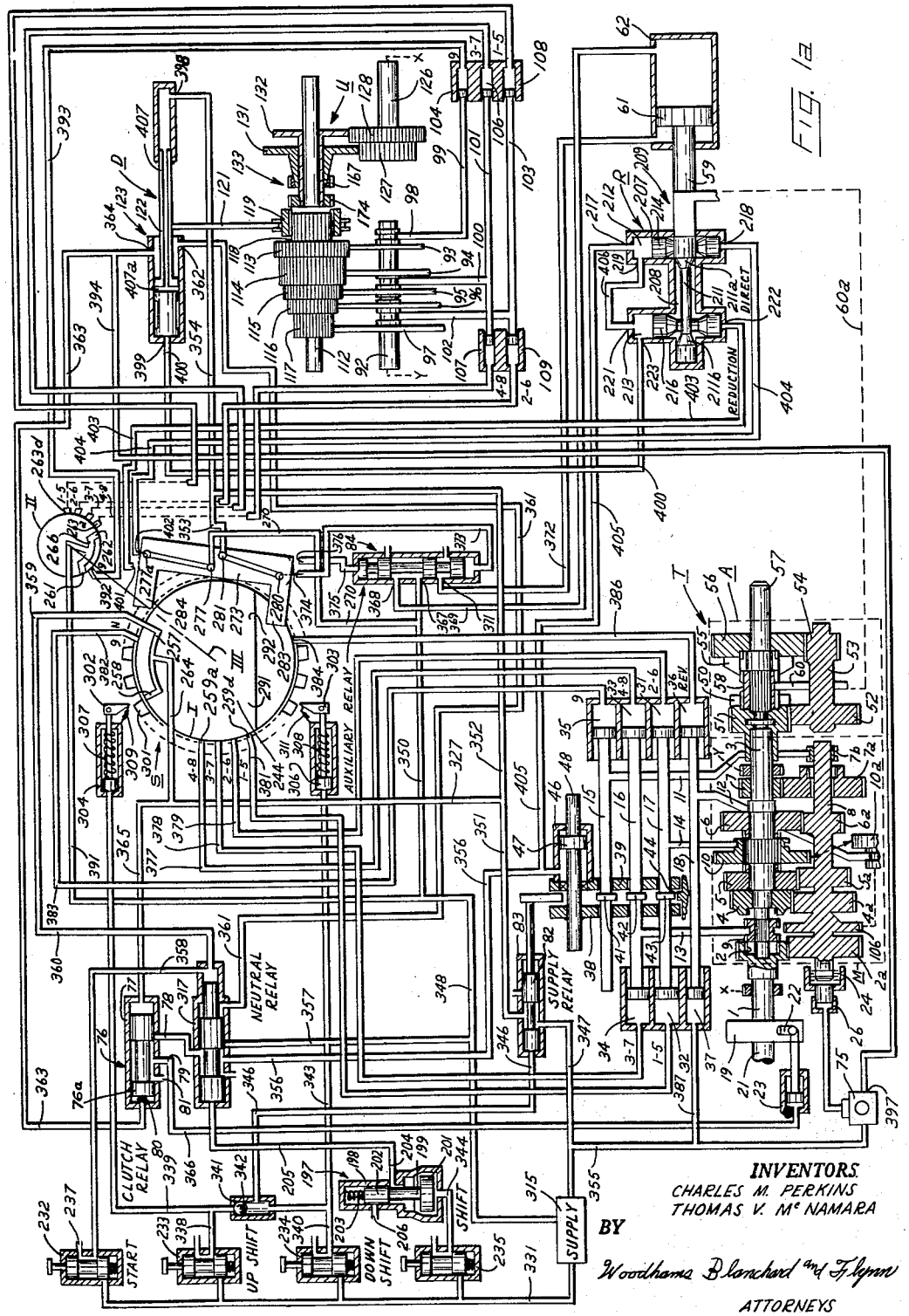

C. M. PERKINS ETAL 3,171,300

CONTROL FOR A MAIN AND AUXILIARY TRANSMISSION SYSTEM

Filed July 11, 1961

FIRST GEAR

FORTH GEAR, AUXILIARY IN REDUCTION

FIFTH GEAR, AUXILIARY IN DIRECT

INVENTORS.
CHARLES M. PERKINS
THOMAS V. McNAMARA
BY
Woodhams Blanchard and Flynn
ATTORNEYS INVENTORS
CHARLES M. PERKINS
THOMAS V. McNAMARA
BY Woodhams, Blanchard & Flynn
ATTORNEYS

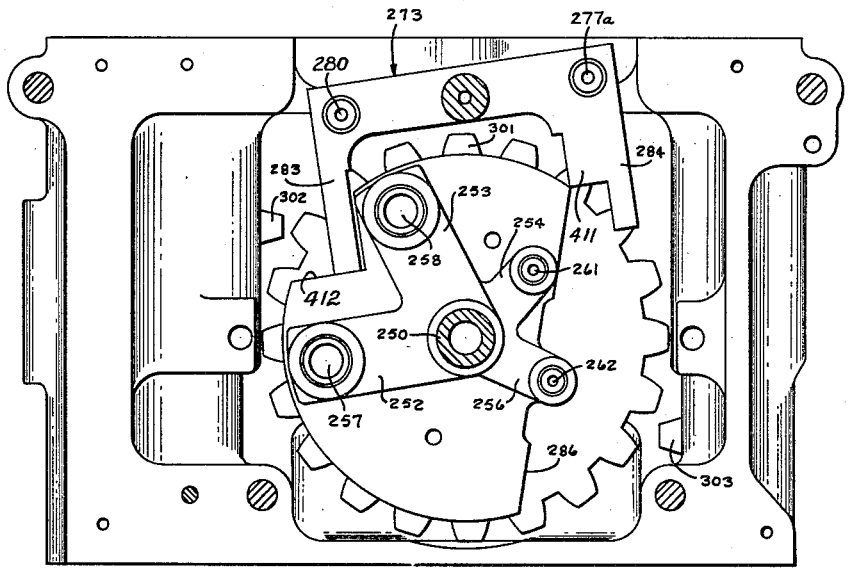

March 2, 1965  C. M. PERKINS ETAL  3,171,300
CONTROL FOR A MAIN AND AUXILIARY TRANSMISSION SYSTEM
Filed July 11, 1961  8 Sheets-Sheet 7

INVENTORS.
CHARLES M. PERKINS
THOMAS V. McNAMARA
BY
Woodhams Blanchard and Flynn
ATTORNEYS

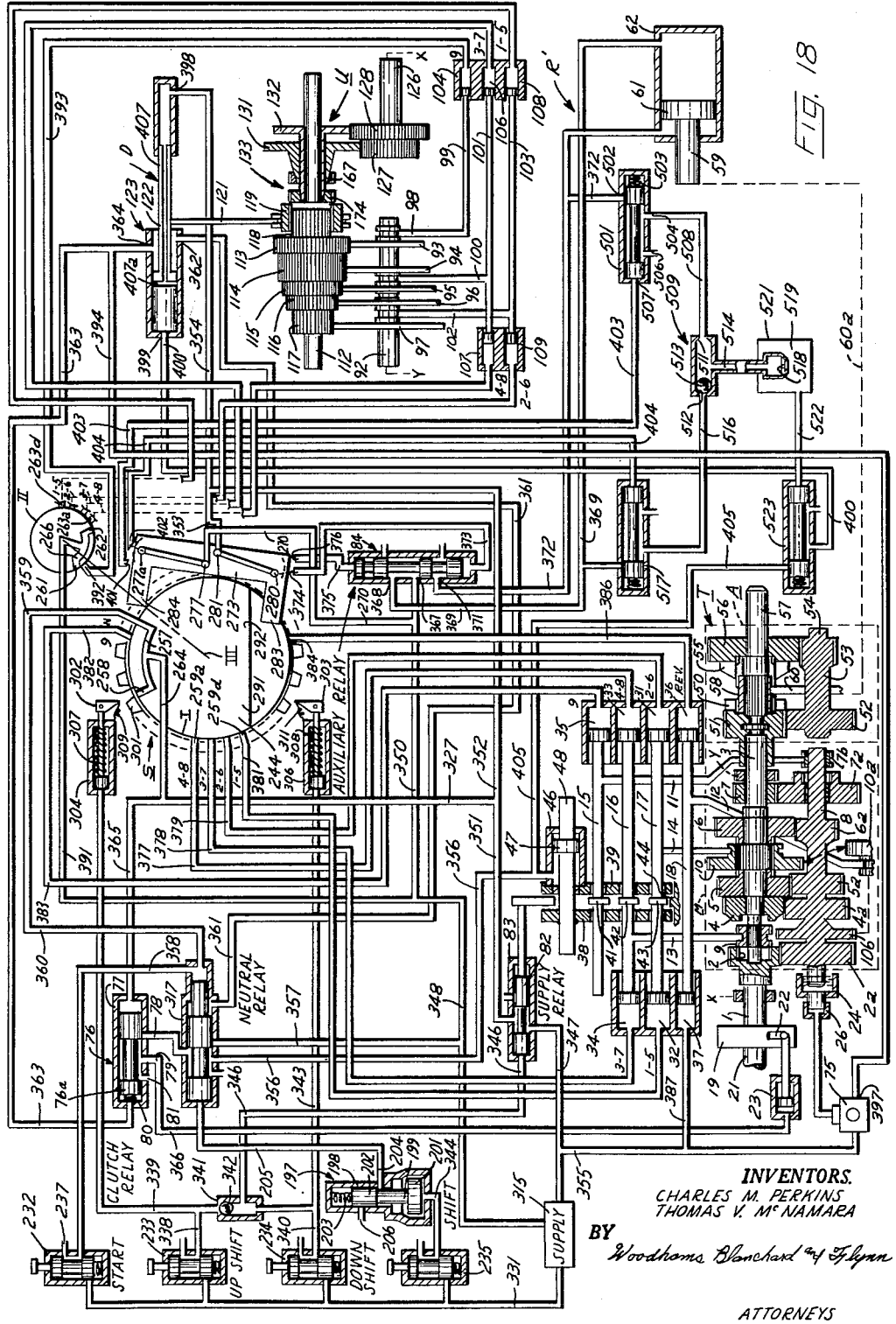

United States Patent Office 3,171,300
Patented Mar. 2, 1965

3,171,300
CONTROL FOR A MAIN AND AUXILIARY
TRANSMISSION SYSTEM
Charles M. Perkins, Oshtemo Township, Kalamazoo County, and Thomas V. McNamara, Cooper Township, Kalamazoo County, Mich., assignors to Eaton Manufacturing Company, Cleveland, Ohio, a corporation of Ohio
Filed July 11, 1961, Ser. No. 123,608
20 Claims. (Cl. 74—745)

This invention relates to transmission control apparatus and it particularly concerns apparatus for preventing the shift of a main transmission until after the shift of a serially connected axuiliary transmission is completed.

In United States Patent No. 2,637,221, issued May 5, 1953, to Ludvigsen and Backus, there is set forth a system by which a serially connected auxiliary transmission is shifted through a step greater than the total ratios of the main transmission and this is accomplished by first shifting the main transmission into neutral position then effecting the shift of the auxiliary. This has proved effective inasmuch as the synchronizers within the auxiliary transmission are required only to overcome the inertia of the main shaft of the main transmission and this can be accomplished by synchronizers of acceptable size. This control over the shifting of the auxiliary transmission is independent of whether or not there are synchronizers provided between the ratios of the main transmission.

In United States Patent No. 2,943,502, issued July 5, 1960, to Perkins and McNamara, there is described and claimed a system for effecting the shifting of a large, heavy-duty main transmission under conditions of slow speed and heavy load, such as occur in earth moving equipment or in very heavy trucks operating in mountainous terrain. This system is predicated on the concept of initiating the shifting operation slightly ahead of the point of actual synchronization so that the necesasry movements will take place and inertia will be overcome in such a manner that the actual interengagement of the toothed members to be interengaged will take place either exactly at the point of precise synchronization or slightly ahead of such point even though the toothed members to be interengaged are changing speed with respect to each other at a very high rate. This is accomplished by (1) providing indicating means for indicating the speeds of the toothed members about to be engaged, (2) comparing such speeds and (3) causing one of such indicating means to lead the speed of one of such toothed members sufficently ly that a condition of synchronization is indicated slightly before the actual synchronization occurs. Such indication is then utilized to initiate a selected shifting operation.

In combining these two concepts, namely, the so-called "anticipator" shifting of Patent No, 2,943,502 and the so-called "range" shifting of Patent No. 2,637,221, there have appeared problems of sequencing the various operations properly to permit all of the necessary functions to take place but without causing any functions of either system to interfere with the functions of the other system. More particularly, since the range shift in the auxiliary transmission cannot commence until the main transmission is in neutral, and the main transmission normally remains in neutral for only a small fraction of a second when following the anticipator shifting procedure, it has sometimes happened that under the control of the anticipator mechanism the main transmission would continue its shift and move out of neutral prior to the completion of the shifting of the auxiliary transmission. This prevents proper operation of the range shifting function of the auxiliary transmission.

Likewise, where it is desired to utilize the very rapid shifts made possible in a main transmission by the so-called "anticipator" system of Patent No. 2,943,502 with an auxiliary transmission having a half-step splitter, and regardless of whether such auxiliary transmission is ahead of or behind the main transmission, the same problems as above discussed will be encountered and the same solution as hereinafter set forth will be applicable.

Accordingly, the objects of the invention include:

(1) To provide an effective shift control system for an auxiliary ratio change device combined with an anticipator shifted main transmission apparatus.

(2) To provide a shift control system, as aforesaid, having appropriate controls whereby the shifting operations of the auxiliary ratio change device and anticipator shifted main transmission apparatus will take place in such sequence with respect to each other that both systems will operate effectively and neither will interfere with the other.

(3) To provide a shift control system which will prevent the shifting of the main transmission from neutral into the next shift position until completion of the shift in the auxiliary transmission, if any shift of the auxiliary is required.

(4) To provide a shift control system which will be sufficiently rapid in operation that shifting of the auxiliary transmission, if such is required, will be completed while the main transmission remains in neutral and then the completion of the shifting of the main transmission into the next shift position will follow immediately.

(5) To provide a shift control system, as aforesaid, in which the normal synchonization and shifting of the main transmission will proceed automatically after, but only after, completion of the shift of the auxiliary transmission.

(6) To provide apparatus for carrying out the functions above set forth.

(7) To provide a selector valve structure which will automatically control the direction in which the shiftable mechanism of the auxiliary transmission is urged according to the selected ratio in the entire transmission assembly and which will automatically effect a reversal of such direction at appropriate points in the shifting sequence.

(8) To provide means for initiating shifting of the auxiliary transmission only upon entry of the main transmission into neutral position.

(9) To provide means by which shifting pressure is placed upon the shiftable portion of the main transmission but shifting thereof is blocked until the shifting of the auxiliary transmission is completed whereupon the blocking function is removed and the shift of the main transmission is completed very quickly.

(10) To provide a shifting system, as aforesaid, and specific pressure fluid energized apparatus embodying same.

Other objects and purposes of the invention will be apparent to persons acquainted with devices of this general type upon reading the following disclosure and inspecting the accompanying drawings.

In the drawings:

FIGURE 1a is a schematic diagram of the apparatus embodying the invention and showing the system in its "at rest," or "neutral," position.

URE 1b and showing a modification wherein two reverse speeds are available from the transmission.

Figure 2:
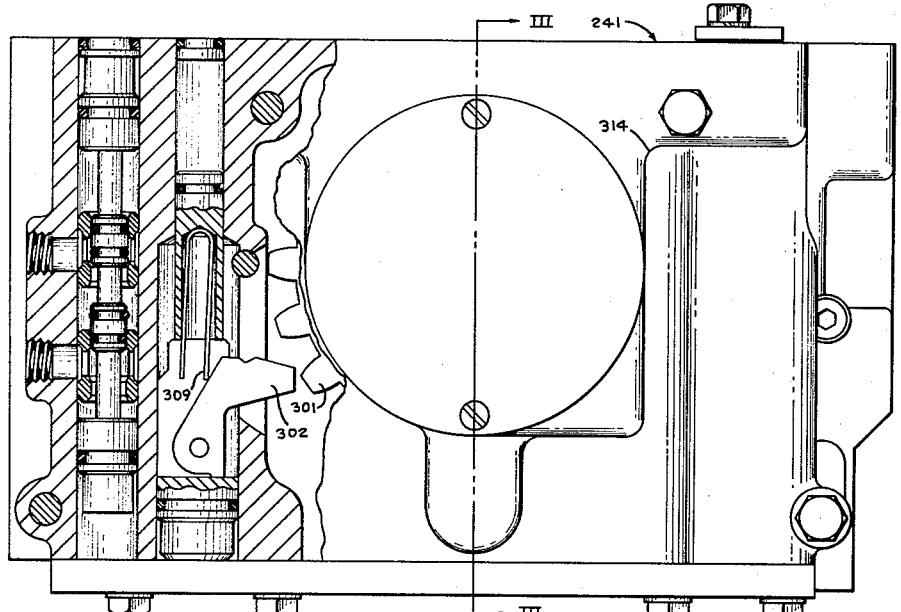

FIGURE 2 is a partially broken, top plan view of the selector valve apparatus utilized in the invention.

Figure 3:
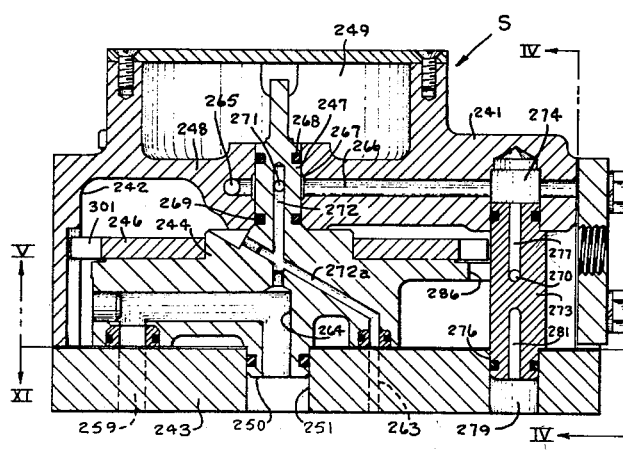

FIGURE 3 is a sectional view taken on the line III—III of FIGURE 2.

Figure 4:
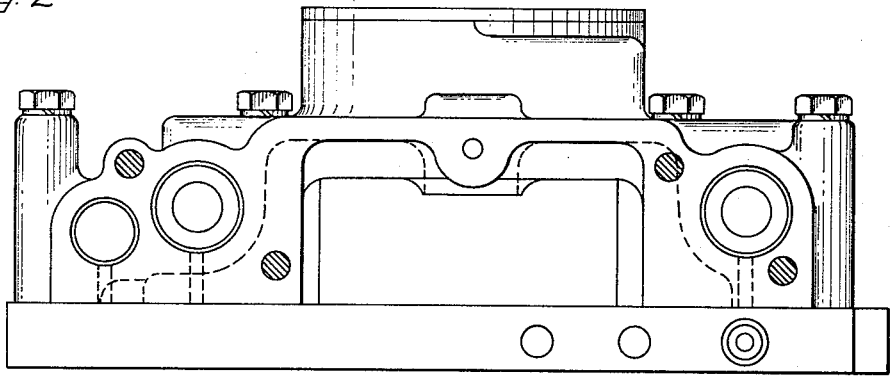

FIGURE 4 is a partially sectional, partially elevational view of the selector valve as viewed on and from the line IV—IV of FIGURE 3.

FIGURE 5 is a sectional view taken on the line V—V of FIGURE 3.

Figure 1B:
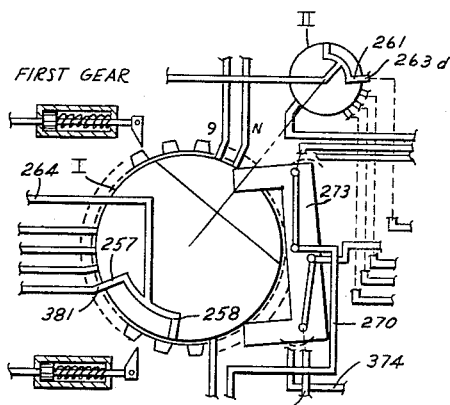
FIGURE 1b is a schematic diagram of a portion of the system shown in FIGURE 1a and showing same upon the completion of a shift into first gear position.
Figure 1C:
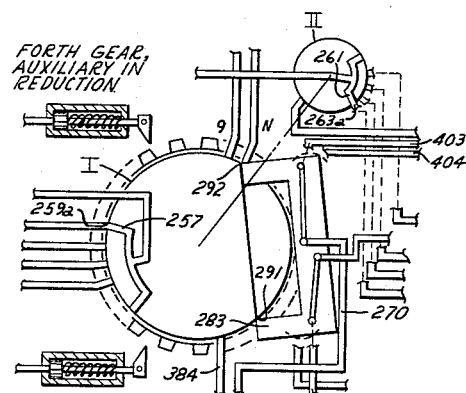
FIGURE 1c is a schematic diagram of a portion of the apparatus shown in FIGURE 1a and showing same in the fourth gear position.
Figure 1D:
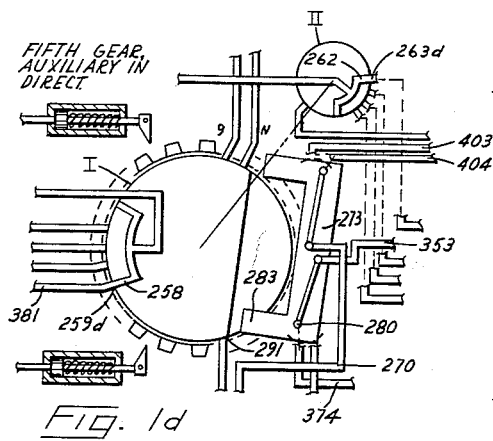
FIGURE 1d is a schematic diagram similar to FIGURE 1c and showing the parts in position corresponding to fifth gear position.
Figure 1E:
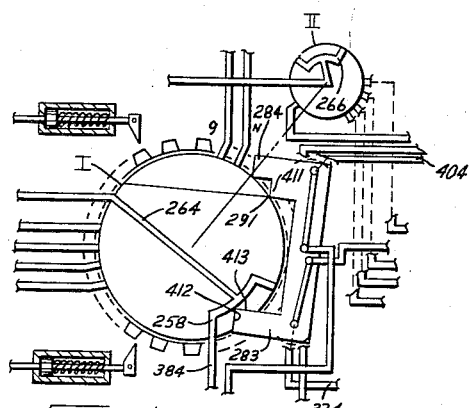
FIGURE 1e is a schematic diagram similar to FIG-

FIGURE 5a is a sectional view similar to FIGURE 5 and showing a modified selector valve structure used with the embodiment shown in FIGURE 1e.

Figure 6:
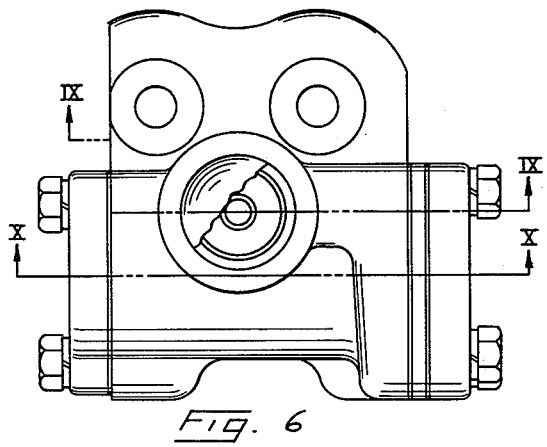

FIGURE 6 is a top plan view of one form of the inhibitor valve utilized in the apparatus embodying the invention.

Figure 7:
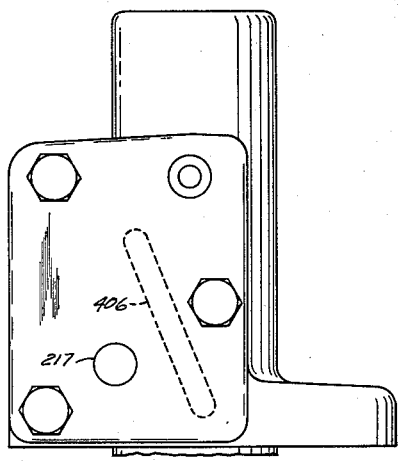

FIGURE 7 is a view of the rightward side of FIGURE 6.

Figure 8:
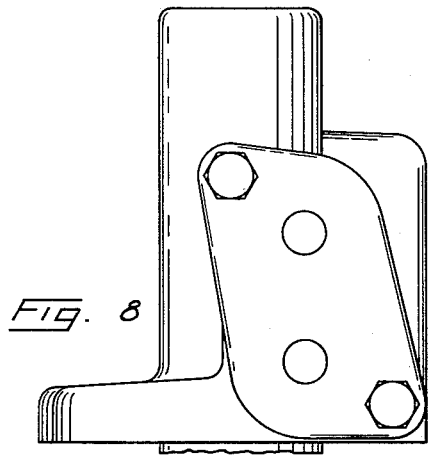

FIGURE 8 is a view of the leftward side of FIGURE 6.

Figure 9:
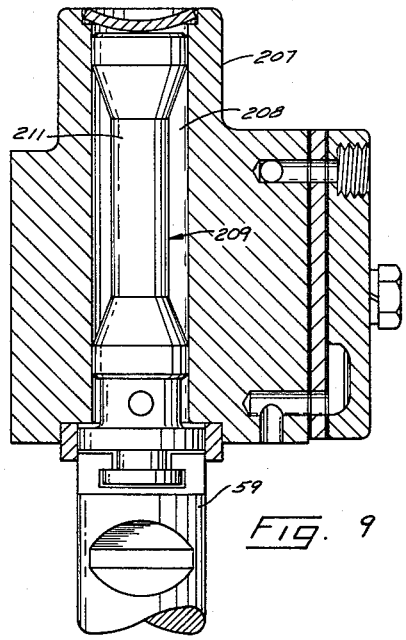

FIGURE 9 is a sectional view taken on the line IX—IX of FIGURE 6.

Figure 10:
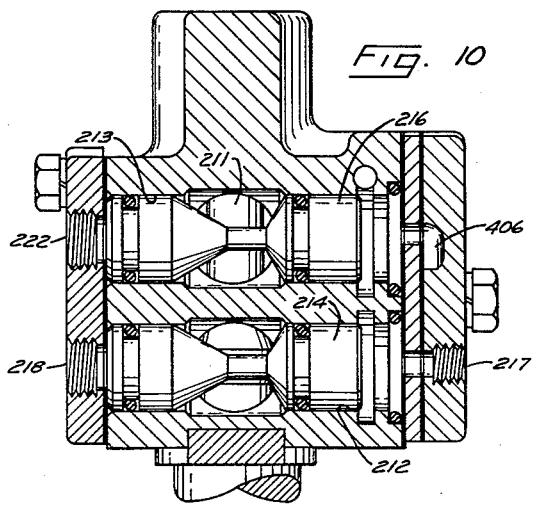

FIGURE 10 is a section taken on the line X—X of FIGURE 6.

Figure 11:
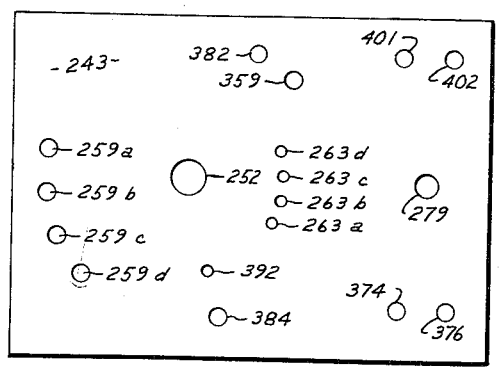

FIGURE 11 is a section taken on the line XI—XI of FIGURE 3.

Figure 12:
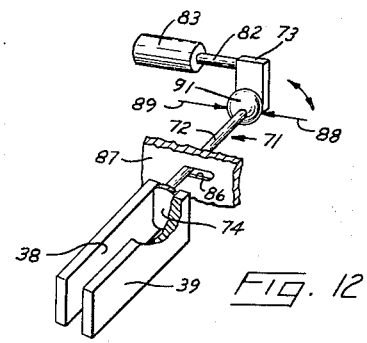

FIGURE 12 is an oblique schematic view of the structure for operating the supply relay valve.

Figure 13:
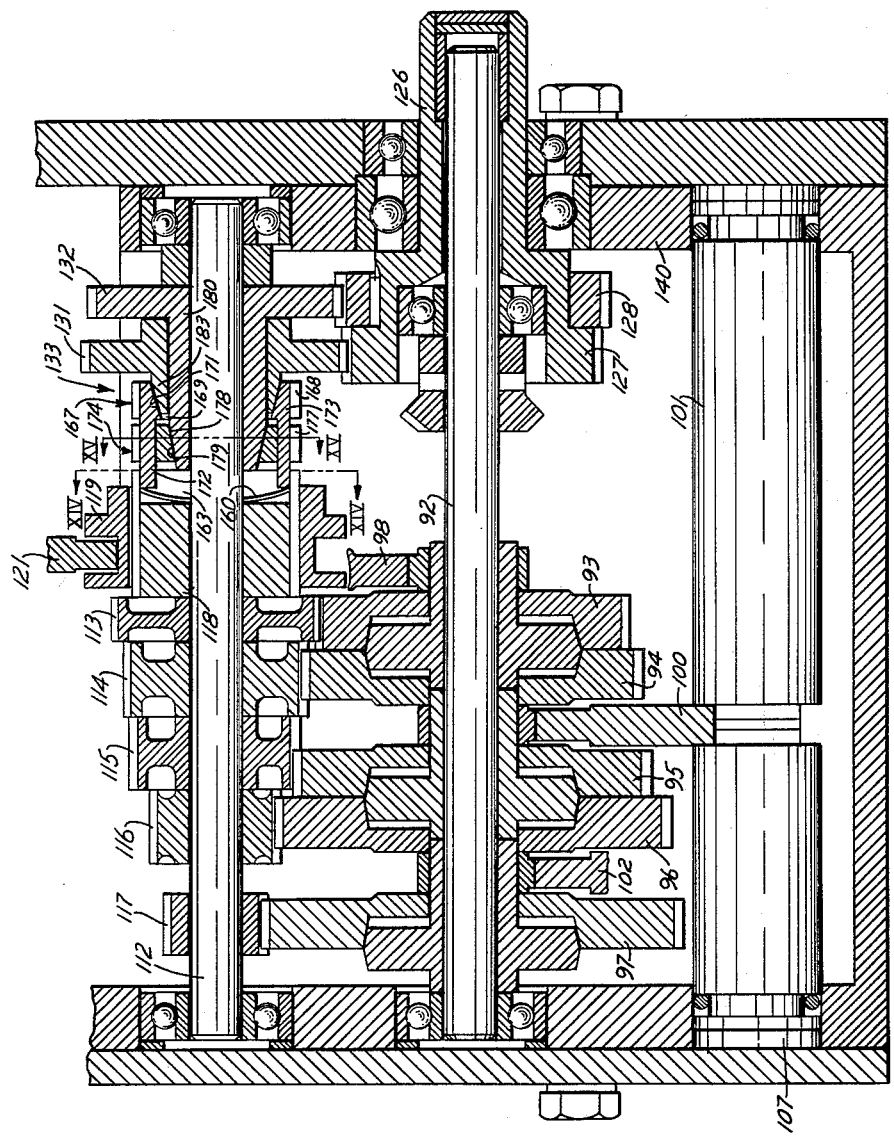

FIGURE 13 is a sectional view through the detector unit.

Figure 14:
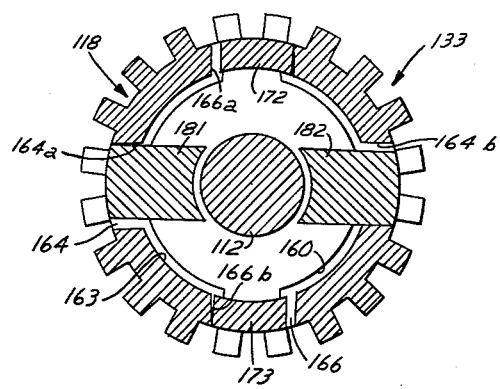

FIGURE 14 is a sectional view taken on the line XIV—XIV of FIGURE 13.

Figure 15:
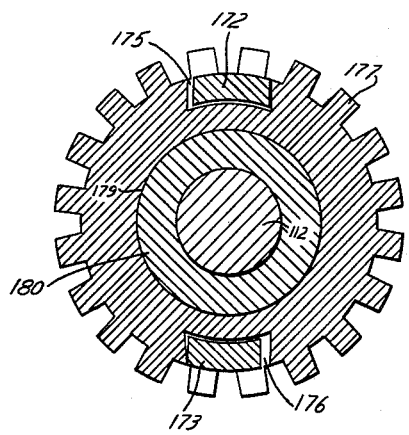

FIGURE 15 is a sectional view taken on the line XV—XV of FIGURE 13.

Figure 16:
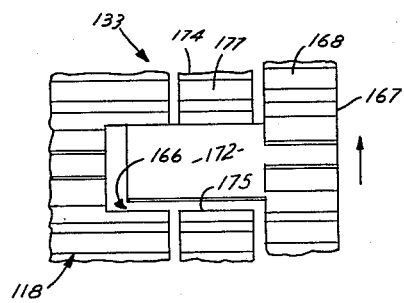

FIGURE 16 is a fragmentary showing of a portion of the synchronizing mechanism in one position of operation.

Figure 17:
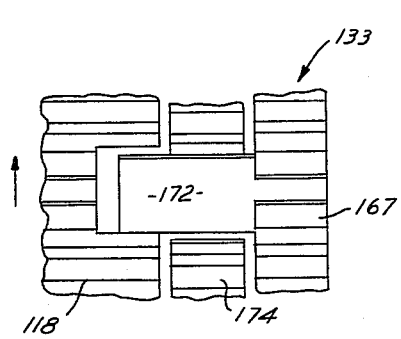

FIGURE 17 is a fragmentary portion of the same mechanism shown in FIGURE 16 in another position of operation.

FIGURE 18 represents a modification.

GENERAL DESCRIPTION

In general the invention contemplates providing serially operable main and auxiliary transmission devices of any convenient kind, manually selectable shift initiating means and means automatically operable following such manual initiation for automatically completing the selected shift. Where no shift of the auxiliary transmission is required the indication of approaching synchronization and the effecting of a shift as a consequence thereof proceeds in a normal manner as set forth in United States Patent No. 2,943,502 above mentioned. However, where a shift of the auxiliary transmission is required, then such signal is interrupted by means responsive to the position of the auxiliary transmission so that said signal is not given and the actual shifting of the main transmission will accordingly not occur until after completion of the shift in the auxiliary. The shifting of the auxiliary transmission is, of course, carried out very quickly so that the prevention of shifting in the main transmission until after the auxiliary shifting is completed effects no real or appreciable delay in the shifting of the main transmission. Thus, the action above described functions primarily as a safety device to prevent damage to the transmission in the event that some delay occurs in the shifting of the auxiliary transmission and to insure that the main transmission will, even under such circumstances, not be shifted until after the shifting of the auxiliary is completed.

DETAILED DESCRIPTION

Ratio shifting apparatus embodying, and chosen to illustrate, the invention consists of a change speed gear group T having a main transmission section M and an auxiliary transmission section A. In this particular embodiment, said main and auxiliary sections are shown as serially positioned but it will be recognized that any arrangement providing for serial functioning thereof will be effective for the purposes of the invention. It will be clearly apparent that the placement of said gear groups in the same or separate casings will be immaterial to the accomplishment of the purposes of the invention.

While the specific transmission here utilized may take any of several forms, the transmission schematically shown in the drawings will sufficiently serve as an illustration of the invention and the following description thereof will therefore be taken as illustrative thereof but not as limiting.

TRANSMISSION STRUCTURE

For the purpose of convenience in reference, the terms "upwardly," "downwardly," "rightwardly" and "leftwardly" and derivatives thereof and words of similar import will be freely used to indicate directions taken with respect to the drawings. Such terminology will be used solely with respect to the drawings and will have no other significance.

An input shaft 1 drives input gear 2. The leftward end of a main shaft 3 of the main transmission M is supported by a bearing located within input gear 2. A plurality of gears 4, 5, 6 and 7 are supported on the main shaft 3, gears 4, 5 and 6 being each normally rotatable with respect to the main shaft 3 and gear 7 in this embodiment rotating with the main shaft. A sleeve 9 is splined to the main shaft 3 and is axially movable thereon to clutch gears 2 and 4 alternately to the main shaft. A gear 10 is splined to the main shaft and is axially movable thereon to clutch the gears 5 and 6 alternately to the main shaft. A countershaft 8 has a gear 2a secured thereto, which gear is constantly driven from the input gear 2. The countershaft has gears 4a, 5a and 6a secured thereto and in constant mesh with the gears 4, 5 and 6, respectively. Gear 7 is meshed with the countershaft gear 7a which is clutchable to the countershaft by the sleeve 7b. A reverse driver 10a, driven in a conventional manner from gear 10b on the countershaft, is axially slidable to engage the drive gear 10 for reverse operation. The gear 10, the splined sleeve 9, the driver 10a and the sleeve 7b are selectively moved by any convenient shift-effecting apparatus, such as shift forks 14, 13, 12 and 11, respectively, which are mounted on and movable with the shift rods 17, 16, 18 and 15, respectively.

A clutch 19 is provided between the input shaft 1 and a power source shaft 21 in the usual manner. Said clutch is operated by the usual lever 22 from a cylinder 23.

The countershaft 8 has a countershaft brake 24 of conventional type connected thereto, said brake being actuated in an already well-known manner by a pressure fluid cylinder 26.

A plurality of pressure fluid cylinders is provided for actuating the shift rods 15, 16, 17 and 18. A cylinder 31 is provided for moving the shift rod 17 leftwardly and a cylinder 32 is provided for moving the rod 17 rightwardly. A cylinder 33 is provided for moving the shift rod 16 leftwardly and a cylinder 34 is provided for moving said shift rod 16 rightwardly. A cylinder 36 is provided for moving the shift rod 18 leftwardly and a cylinder 37 is provided for moving the shift rod 18 rightwardly. A cylinder 35 is provided to move shift rod 15 leftwardly, other means hereinafter described being provided to move rod 15 rightwardly.

A pair of neutralizing plates 38 and 39 have openings therethrough through which the shift rods 15, 16 and 17 pass. The shift rods 15, 16 and 17 have center stops 41, 42 and 43 rigidly affixed thereto, which stops are disposed between plates 38 and 39. A further stop 44, affixed rigidly with respect to the housing of the transmission, is provided for limiting the centerward movement of the neutralizing plates 38 and 39. A neutral cylinder 46 is affixed to the neutralizing plate 39 and a piston 47 disposed within said cylinder is affixed by suitable means, such as the rod 48, to the neutralizing plate 38.

Thus, movement of any of the shift rods 15, 16 and 17 in either direction will move one of said neutralizing plates away from the center stop 44. However, the area within cylinder 46 acted on by fluid pressure is greater than the corresponding areas in cylinders 31 to 35 so that energization of the neutral cylinder 46 will move both of said neutralizing plates toward the center stop 44 even though one of the shift rod cylinders 31–35 may be energized at the time.

Turning now to the auxiliary transmission A, which is here shown as of the range shifting type for illustrative purposes, the main shaft 3 is connected to an auxiliary input gear 51 which, in this embodiment, is in constant mesh with a gear 52 connected to the auxiliary countershaft 53. Countershaft 53 carries a further gear 54 which is in constant mesh with reduction gear 56. Gear 51 is mounted in suitable bearings, not shown, and gear 56 is mounted on the auxiliary main shaft 57, both of said gears being rotatable with respect to said auxiliary main shaft 57. An auxiliary slider 58 is splined on and is axially slidable along the auxiliary main shaft and is provided with jaw clutch means so that in its leftward position as appearing in the drawing the auxiliary input gear 51 will be clutched to the auxiliary main shaft 57 and in its rightward position the auxiliary reduction gear 56 will be clutched to the auxiliary main shaft 57. The slider 58 is moved along the shaft 57 by any conventional means such as a shift fork indicated schematically at 60. Synchronizer means 50 are placed between the teeth at the leftward end of the slider 58 and the auxiliary input gear 51 and further synchronizer means 55 are placed between the teeth at the rightward end of the slider and the auxiliary reduction gear 56. Each of said synchronizer means may be of any conventional form, either of the clutch-plate type or the cone type, but to minimize space requirements they are preferably of the clutch-plate type, such as that shown in U.S. Patent No. 2,627,955.

The shift fork 60 is connected by any convenient means 60a to the rod 59 and thence to a piston 61 within a cylinder 62.

FIGURE 12 shows a crank mechanism 71 which operates in response to the neutralizing plates 38 and 39. Said crank 71 has a central shaft 72 with a valve crank 73 at one end thereof and a plate crank 74 at the other end thereof. The lower or free end of the plate crank 74 extends between the plates 38 and 39 and is snugly held therebetween when said plates are in their full centered position. The rod 72 extends through a slot 86 in a wall 87, said wall being a part of the frame of the transmission. The arrows 88 and 89 schematically indicate bearings acting against the ball 91 for holding said rod in an operable position as hereinafter further described. The plunger 82 of the supply relay valve 83 bears against the crank 73.

Thus, when both the neutralizing plates 38 and 39 are in their centered position, the crank 73 cannot rotate in either direction and supply relay valve 83 cannot respond to pressure in line 346 (FIGURE 1a) by moving into its rightward position. Thus, the valve is held in its leftward position as shown in the drawings. However, upon movement of the neutralizing plate 39 rightwardly, the rod 72 is permitted to pivot clockwise around a pivot provided between the lower end of the crank 74 and the neutralizing plate 38, such movement being permitted by the slot 86. This permits the valve 83, upon pressurizing of the line 346, to move rightwardly. Restoration of the plates 38 and 39 to their centered positions will return the crank 73 to the position shown in the drawings and return the valve 83 to its leftward position. Movement of the plate 38 leftwardly will permit the lower end of the crank 74 to move leftwardly and thus permit the rod 72 to rotate clockwise. This again permits the crank 73 to move clockwise and the valve 83 to move, in response to the pressurizing of line 346, into its rightward position. Again the restoration of the neutralizing plates 38 and 39 to their centered positions returns the crank arm 74 to its centered position as shown in the drawings and restores the valve 83 to its leftward position as shown in the drawings.

Now turning to the pressure fluid system, a description will first be made of the several valves and mechanism utilized therewith and this will be followed by description indicating the manner by which these parts cooperate with each other.

PRESSURE FLUID SYSTEM (a) *Pressure fluid devices*

The brake relay valve 75 is of any conventional type by which the fluid pressure supply 315 is connected to the brake cylinder 24 upon the appearance of pressure at the port 397.

The clutch relay valve 76 includes a housing 77 having ports 78 and 79 and having an exhaust port 81. A plunger 76a is slidably disposed in the housing 77. Other conduits 363 and 365 are connected to the ends of housing 77 to supply pressure fluid thereto whereby said plunger 76a is urged rightwardly or leftwardly as developed further hereinafter. The plunger 76a is normally urged rightwardly by a spring 80.

A supply relay valve 83 and an auxiliary relay valve 84 are also provided and are generally similar to the clutch relay valve excepting for details which will be brought out hereinafter.

The pulse valve 197 comprises a housing 198 having a rod 199 therein, said rod carrying pistons 201 and 202 of different sizes. Rod 199 is urged downwardly by the spring 203 and when it is in its downward position as shown, pressure fluid from conduit 344 entering through the lower end of the pulse valve 197 will pass by the piston 201 and out through the conduit 204. So long as there is no back pressure in the line 204, the spring 203 will hold the rod 199 in position as shown. However, as soon as a back pressure develops in line 204, the pressure against the lower face of the piston 202 increases. This will push the rod 199 upwardly. In this position pressure fluid within the line 204 will exhaust through the exhaust port 206 but pressure from conduit 344 will now act against the lower face of the piston 201 to hold said valve in its upward position. Hence, the rod 199 will remain firmly in its upward position so long as there is pressure in conduit 344.

The four manually operable valves 232, 233, 234 and 235 appearing at the leftward side of FIGURE 1a are similar, manually operated, three-way valves of standard construction and need no detailed description other than that appearing in connection with the description of the general organization of the apparatus which follows hereinafter.

An inhibitor unit R is provided in mechanical association with the rod 59 of the auxiliary shifting unit and includes a housing 207 having a longitudinal opening 208 therein (FIGURES 1a and 9). An inhibitor rod 209 having a reduced central portion 211 is slidably disposed within opening 208 and is mechanically connected to the rod 59. A pair of transverse chambers 212 and 213 (FIGURES 1a and 10) are also provided in said housing offset sidewardly from but each being in communication with the longitudinal opening 208. A pair of inhibitor valve plungers 214 and 216 are received within said transverse chambers and each has a portion of reduced diameter intermediate its ends. The inhibitor rod 209 and the inhibitor plungers 214 and 216 have bevelled portions connecting their ends with their respective reduced diameter portions.

The transverse chamber 212 has ports 217 and 218 at its ends to which suitable conduits are connectible and it has further a port 219 at its side for communication with the port 217 when the valve plunger 214 is in its downward (FIGURE 1a) position. The transverse chamber 213 has ports 221 and 222 at its respective ends connectible to conduits and it too has a side port 223 which is in communication with the port 221 when the inhibitor plunger 216 is in its lower (FIGURE 1a) position.

The narrow central portion 211 of the rod 209 cooperates with the narrow central portions of the valve plungers 214 and 216 in such a manner that when the inhibitor rod 209 is in its leftward position as shown in FIGURE 1a, the valve plunger 216 is permitted to move upwardly upon a pressure appearing at the opening 222 therebelow but the valve plunger 214 is prevented from moving upwardly even upon the appearance of a pressure at the opening 218 therebelow. However, the ramps 211a and 211b are so related to the corresponding ramps on said valve plungers that, assuming that the valve plunger 216 is in its upward position, rightward movement of the piston 61 and consequently of the inhibitor rod 209 will pull the valve plunger 216 downwardly and the enlarged leftward end of the inhibitor rod 209 will prevent upward movement of the valve plunger 216 for so long as said inhibitor rod 209 is in its rightward position. However, such rightward movement of inhibitor rod 209 brings the narrow part 211 of said inhibitor rod in line with the valve plunger 214 and thereby permits it to move upwardly if and when a pressure appears at the port 218.

Correspondingly, leftward movement of the inhibitor rod 209 acts through its ramp 211a to pull the valve plunger 214 downwardly into a position shown in FIGURE 1a and permits upward movement of the plunger 216 upon the appearance of a pressure at the port 222.

When the valve 214 is in its upward position it will close off the port 219 and when the valve plunger 216 is in its upward position it will close off the port 223.

Turning now to the selector valve S, this is generally similar to the mechanism previously utilized in the abovementioned patents and application and in addition is provided with additional means for controlling the auxiliary shifting unit. In the specific embodiment herein illustrated, the selector valve comprises a housing 241 (FIGURE 2) having an internal chamber 242 (FIGURE 3) which is closed by bottom plate 243. A rotor 244 (FIGURES 1a and 3) carries a ratchet 246 thereon, said rotor and said ratchet being rotatable together. Said rotor also carries a shaft 247 which is rotatably received within a wall 248 extending across the upper portion of said housing. A chamber 249 is defined at the upper part of said housing for receiving electrical switches, if desired, whereby the position of said rotor may be suitably indicated to the operator of the vehicle. The lower end of the rotor 244 is provided with an extension 250 rotatably received within an opening 251 within the plate 243.

The ratchet 246 is provided with teeth 301 thereon against which act pawls 302 and 303 (FIGURES 1a and 2) in response to actuation of fluid pressure cylinders 304 and 306. Suitable constantly acting means such as springs 307 and 308, normally hold said pawls in their leftward (as appearing in FIGURE 1a) position and further constantly acting means, such as springs 309 and 311, hold the pawls normally in position for engaging the teeth 301 but permit the pawls to ride over rearwardly adjacent teeth on their retracting stroke following a given actuation thereof.

Said rotor 244 has a pair of large extensions 252 and 253 (FIGURE 5) and a pair of small extensions 254 and 256. The pair of large extensions have openings 257 and 258, respectively, therein which are adapted to communicate with a plurality of openings 259a (FIGURES 3 and 11), 259b, 259c, 259d, 382, 384 and 359 in the bottom plate 243. Similar openings 261 and 262 are provided within the arms 254 and 256, respectively. The openings 261 and 262 are arranged for communication with further openings 263a, 263b, 263c, 263d and 392 within the bottom plate 243.

A central passageway 264 communicates with the opening 251 and is divided into branches communicating with the openings 257 and 258. Opening 251 is connectible to a source of pressure fluid. A further passageway 266 communicates as convenient through opening 265 with another supply of pressure fluid and also communicates with a chamber 267 surrounding the shaft 247 between suitable fluid seals 268 and 269. The shaft has a radial opening 271 extending between chamber 267 and a central passageway 272 in the shaft 247. The passageway 272 has branches 272a in the arms 254 and 256 communicating with the openings 261 and 262 (FIGURE 5).

A rocker 273 is provided with oppositely positioned, coaxial, stub shafts, the upper one 274 of which is pivotally received in the housing 241 and the lower one 276 of which is pivotally received in the bottom plate 243. The rocker 273 has a first central passage 277 supplied through passageway 279 (FIGURES 1a and 3) which communicates with an opening 277a (FIGURES 1a and 5) in the lower side of said rocker 273. Opening 277a is alternately registerable with ports 401 and 402 (FIGURE 11) in bottom plate 243. An opening 279 through the bottom plate 243 communicates with a second central passage 281 in said rocker and thence communicates with a further opening 280 in the bottom of said rocker at the other end thereof with respect to the opening 277a. Opening 280 is alternately registerable with parts 374 and 376 in plate 243.

Said rocker 273 has legs 283 and 284 extending therefrom at points spaced from the central pivot point about which said rocker operates for purposes appearing hereinafter. The rotor 244 has a notch 286 provided therein which in this instance constitutes a chordal sector of said rotor. The relationship of said rocker 273 and the legs 283 and 284 thereof with said rotor 244 and the notch 286 thereof is illustrated in FIGURES 1a, 1b, 1c, 1d and 5, wherein it is shown that:

(1) Commencing (FIGURE 1a) with the notch 286 in a position substantially parallel with the arms 283 and 284, the portion of the rotor 244 adjacent the arm 284 will clear said arm whereby said rotor can rotate counterclockwise as appearing in FIGURE 1a and will not interfere therewith until the end 291 of notch 286 engages leg 283.

(2) Upon counterclockwise rotation thereof, the portion of said rotor adjacent to the arm 283 will first come to a position adjacent to said arm as shown in FIGURE 1d and upon continued counterclockwise rotation will effect a rocking of the rocker 273. This will move the arm 283 out of the way of said rotor and enable the rotor to continue counterclockwise rotation with the corner 291 of the notch 286 now clearing the adjacent corner of the arm 283.

(3) This, however, moves the arm 284 into its inward position whereby upon clockwise rotation of said rotor it will be struck by the corner 292 of the notch 286 and effect an opposite rocking of said rocker.

As said rotor rotates, it does so with respect to the bottom plate 243 and the openings 257 and 258 therein come successively into register with one of the openings 259a–259d, 359, 382 and 384 therein and the openings 261 and 262 come successively into register with the openings 392 and 263a–263d therein.

Referring again to FIGURES 1a to 1d, inclusive, the circle described by the openings 257 and 258 is indicated by the circle I therein with the openings 257 and 258 being disposed inside of said circle and the corresponding openings 259a–259d, 382, 384 and 359 being disposed outside of said circle. The circle described by the openings 261 and 262 is shown at II with the broken line III indicating mechanical connection between said circles.

The openings 261 and 262 are indicated schematically on the inside of said circle II and the openings 263a–263d, inclusive, and 392 are indicated schematically on the outer side of said circle.

(b) Pressure fluid connections

Turning now to the pressure fluid connections for said mechanism, a source 315 of pressure fluid is provided in any convenient manner and may include a reservoir of compressed air supplied and held under pressure by any convenient means, not shown. Said supply is connected by a line 331 to the inlets of the manually operable valves 232, 233, 234 and 235. Each of said valves is spring biased to normally close their respective inlets. The outlets of each of said valves are normally connected to the exhaust openings thereof but are connectible to the inlets thereof by depression of the manually operable buttons. The outlet of the start valve 232 is connected by a conduit 358 to the rightward end of the neutral relay 317. The outlet of upshift preselect valve 233 is connected by a conduit 338 to the upper end of the shuttle valve 341. Such shuttle valve is comprised of a housing surrounding a ball 342, which ball moves from the upper to the lower end of the housing, and thereby closes one or the other of the lines connected thereto. The outlet of upshift preselect valve is also connected to cylinder 304.

The line 340 from the outlet of the downshift preselect valve 234 connects to the lower end of the shuttle valve 341 and connects further through a line 343 to the leftward end of the other cylinder 306. The outlet line 344 of the shift valve 235 connects to the lower end of th pulse valve 197. The outlet 204 of said pulse valve 197 connects to the leftward end of the neutral relay 317. The middle connection of the shuttle valve 341 connects through a line 346 to the leftward end of the supply relay 83.

Returning now to the supply 315, it is further connected by a line 347 to one connection of the valve 83 and is further connected through lines 348 and 350 to a port 367 of auxiliary relay 84. Line 348 is also connected by line 391 to passage 266 so that pressure fluid is continuously supplied to openings 261 and 262. Line 348 is connected by lines 350 and 270 to passage 277 so that pressure fluid is continuously supplied to opening 277a. A line 355 connects the supply 315 to the supply connection of the brake relay 75.

Returning to the supply relay 83, its other principal port is connected by a line 351 to the line 327 and is also connected by a further line 352 to the supply lines 353 and 354 of the rocker 273 and detector valve 123, respectively. Line 327 is connected to the rightward end of clutch relay valve 76 and is connected to the passage 264.

One port of the neutral relay 317 is connected by a conduit 356 to the neutral cylinder 46. Another port of neutral relay 317 is connected by another conduit 357 to the supply conduit 348. Still another port of relay 317 is connected by line 358 to the outlet of start valve 232. The extreme rightward end of neutral relay 317 is connected by a conduit 360 to the neutral opening 359 in the outer ring of valve ports of the selector unit S. A further and intermediate port of the neutral relay 317 is connected by conduit 361 to a port 362 of the detector valve 123.

The clutch relay 76 has its rightward end connected by a conduit 365 to the conduit 327. The other end of said clutch relay is connected by a conduit 363 to another outlet port 364 of the detector valve 123. Port 79 of the clutch relay 76 is connected by a conduit 366 to the clutch cylinder 23.

Turning now to the auxiliary relay 84, the supply line 348 is connected to the port 367 thereof and an adjacent port 368 is connected by a line 369 to the rightward end of the auxiliary actuating cylinder 62. A further outlet port 371 is connected by a line 372 to the leftward end of the auxiliary cylinder 62. The lower end of the auxiliary relay 84 is connected by a line 373 to the leftward port 374 associated with the opening 280 of said rocker 273. The upper end of auxiliary relay 84 is connected by a conduit 375 to the rightward port 376 associated with opening 280 of said rocker.

The ports 259a–259d, inclusive, in the outer circle I of the rotor 244 are connected by conduits 377, 378, 379 and 381, respectively, to the shift cylinders 33, 34, 31 and 32, respectively. The ninth speed port 382 of rotor 244 is connected by a conduit 383 to the ninth speed shift cylinder 35. A reverse port 384 of the rotor 244 is connected by a conduit 386 to the reverse cylinder 36. A conduit 387 provides a constant pressure fluid supply from the line 355 to the cylinder 37 for providing a constant return pressure for reverse shift rod 18.

The inner circle II of ports associated with the selector valve S has a conduit 266 connecting the ports 261 and 262. The conduit 266 is connected by the line 391 to the supply line 348, whereby to provide a constant supply of fluid pressure to said ports 261 and 262. The outlet ports registerable therewith, namely, the ports 263a–263d, inclusive, are respectively connected by suitable conduits to the detector shift rod cylinders 107, 106, 109 and 108, respectively. A port 392 is connected by a conduit 393 to the detector shift rod cylinder 104.

Referring to the detector signaling cylinder 123, a line 394 connects port 364 thereof to the actuating port 397 of the brake relay valve 75. A port 399 at the leftward end of said valve 123 is connected by a conduit 400 to a port 223 of the inhibitor valve R. A port 398 at the rightward end of said valve 123 is connected by the conduits 354, 352 and 351 to the supply relay 83.

The upper port 277a of rocker 273 registers alternately with ports 401 and 402 which are respectively connected by conduits 403 and 404 to the ports 222 and 218 of the inhibitor valve R.

In the inhibitor valve R, the upper end of the chamber 212 thereof is connected by a conduit 405 to the neutral cylinder 46. The upper end of the corresponding chamber 213 is connected by a conduit 406 to the port 219 of said chamber 212.

The core 122 of the valve 123 has a central passage 407 therein. The passage 407 has a transverse portion 407a which can be placed in communication with either the port 364 or port 362 as desired.

(c) The signaling device

There is provided further a signaling unit U for detecting the relative speeds of the toothed elements about to be engaged and giving a signal when said speeds are in predetermined relationship to each other. Preferably, the signaling unit initiates shifting of the shiftable parts at a point slightly ahead of actual synchronization thereof for reasons fully set forth in United States Patent Nos. 2,943,502 and 2,943,719. While any of many signaling units may be used with the apparatus of the present invention, suitable apparatus for this purpose may be that shown in either of the patents above named or in United States Patent No. 3,103,826, assigned to the same assignee as the present application. For purpose of convenient reference, the signaling unit is shown here as substantially the same as that shown in Patent No. 2,943,719 and will be briefly described following.

The signaling device U (FIGURE 1a) is provided for giving a signal at the moment when the gears of the toothed elements of the main transmission, which are about to become engaged by a given shifting operation, have reached a selected condition preceding a state of synchronism. Said condition is based on the actual relative speeds of said toothed elements, and the signaling device is caused to give the desired signal when said relative speeds become sufficiently close to synchronism that, if the signal for the completion of the shifting operation is given at that moment, said gears will be in, or substantially in, exact synchronism at the moment when they start to engage each other. In this way, the shift is made rapidly and silently and with a minimum of wear on the interengageable toothed elements. The signaling mechanism is such that by its own inherent structure the signal will be given at the proper time regardless of whether the transmission is being operated in an upshift or a downshift sequence.

In general, and still with reference to FIGURE 1a, said signaling unit U includes a first shaft 92 having a plurality of ratio gears 93, 94, 95, 96 and 97 supported thereon and arranged for rotation with respect thereto. A yoke 98 is provided in association with a shift rod 99 for connecting the gear 93 to the first shaft 92 in response to axial motion of said shift rod 99. A yoke 100 is arranged in association with a shift rod 101 for connecting the gears 94 and 95 alternately to the first shaft 92 upon axial movement in one direction or the other of the shift rod 101. A third yoke 102 is arranged in association with a third shift rod 103 and is provided for connecting one of the gears 96 and 97 to the first shaft 92 upon movement of the third shift rod 103 axially in one direction or the other. A suitable signaling cylinder 104 is provided for axial actuation of the first shift rod 99. Similar signaling cylinders 106 and 107 are provided for axial actuation of the second shift rod 101 and other cylinders 108 and 109 are provided for axial actuation of the third shift rod 103. Connecting means indicated generally at Y—Y are provided for connecting one end, here the main transmission main shaft 3, of the transmission T with the first signaling shaft 92.

A second signaling shaft 112 is rotatably supported parallel with the first signaling shaft 92 and is provided with gears 113, 114, 115, 116 and 117, which are fixed thereon, each of said gears being respectively in constant mesh with the gears 93 to 97. A splined drive member 118 is also fixed to said second shaft 112 and supports a slidable sleeve 119 in axially movable, nonrotative, relationship therewith. Said sleeve is rendered axially movable by the yoke 121 which is connected to a rod 122 which is actuated by the signal valve structure 123 as hereinabove described in more detail.

The other end, here the input shaft 1 (FIGURE 1) of the transmission T, is connected by connecting means, schematically indicated at X—X, to a shaft 126 which is rotatable with respect to the housing of the signaling unit U, and is here shown as mounted coaxial with the first signaling shaft 92. A pair of coaxial gears 127 and 128, having slightly different pitch diameters, are secured upon, and rotatable with, the shaft 126. Cooperating gears 131 and 132, which are in constant mesh with the gears 127 and 128, respectively, are arranged rotatably on, and with respect to, the shaft 112 and also arranged rotatably with respect to each other. Speed sensitive means 133 is provided for cooperation with the sliding sleeve 119 for connecting one or the other of the gears 131 and 132 to the shaft 112.

Referring now to FIGURE 13, for more details of said speed sensitive unit 133, there is provided a pair of serially arranged blocker members 167 and 174 cooperating with the gears 131 and 132. Said structure 133 is arranged for limiting at one of two predetermined points axially rightward movement of the sleeve 119 in response to pressure applied to the valve core 122 (FIGURE 1a) through line 400 and permitting such axial movement beyond said points only when certain speed relationships have been established between the shaft 112 and the shaft 92, and consequently between the input and output shafts of the main transmission.

A recess 163 is provided in the rightward end (FIGURE 13) of the splined member 118 and slots 164 and 166 (FIGURE 14) are provided extending diametrically across said rightward end of said member 118 to the same depth as the recess 163.

An upshift blocker 167 (FIGURES 13, 17 and 18) is provided with teeth 168 having the same shape and spacing as the splines on the member 118. Said blocker 167 has a tapered opening 169, the wall of which rides upon, and is frictionally engaged by, a similarly tapered surface 171 on the hub 183 (FIGURE 13) of the gear 131. Tongues 172 and 173 (FIGURES 13 and 14) extend from the body of the blocker 167 into the respective parts 166a and 166b of the slot 166. However, it will be noted that said tongues are narrower than said slot by a distance approximately equal to one-half the width of one tooth.

A downshift blocker 174 is arranged between the upshift blocker 167 and the splined member 118 and has slots 175 and 176 (FIGURE 15), through which the tongues 172 and 173 can extend. Said blocker 174 is provided with teeth 177 similar in size and shape to the splines on the member 118 and it is provided with a tapered opening 178, the wall of which rides upon, and is frictionally engaged by, a similarly tapered surface 179 on the hub 180 of the gear 132. Extending leftwardly from the body of the blocker member 174 are suitable lugs 181 and 182 (FIGURE 14) which are received into the parts 164a and 164b, respectively, of the slot 164. The lugs 181 and 182 are each narrower than the respective slots into which they are received by a distance approximately equal to one-half the width of a spline on the splined member 118.

Resilient means, such as the leaf spring 160 is disposed between the axial end wall of the cavity 163 in the splined member 118 and the adjacent ends of the tongues 172 and 173, and the lugs 181 and 182. Thus, since the splined member 118 and hubs 180 and 183 are held against appreciable movement away from each other, the spring 160 urges the blocker members 167 and 174 into frictional engagement with their respective tapered surfaces 171 and 179. Further details of this detector unit may be found in Patent No. 2,943,719.

OPERATION

*(a) Operation of mechanical parts*

Turning now to the pressure fluid responsive mechanism and the mechanical operations by which a shifting operation takes place, attention is again called to the fact that the particular shifting apparatus here utilized to illustrate the invention is substantially similar to that illustrated and described in application Serial No. 39,064, assigned to the same assignee as the present invention. However, the apparatus herein described embodies improvements over that appearing in said previous application. Accordingly, it will be described herein briefly for the purpose of a ready understanding of the present invention.

Assuming first that the vehicle is at a standstill with the engine idling, a pressure will be created at the pressure supply 315 and will pressurize the line 331. However, since each of the valves 232, 233, 234 and 235 is closed, the pressure fluid will stop at these respective valves. Pressure will, however, supply the lines 347, 348, 350 and 355 and other lines directly connected thereto. The clutch may be placed in a disengaged position by depression of the foot pedal by the operator. Since the valve 75 will be held in its closed position, pressure in line 355 will stop at this valve. With valve 83 positioned as shown, pressure will pass through relay valve 83 to line 351 and thence to line 327 and through selector S and its neutral port 359 to line 360. This holds the core of neutral relay 317 in its leftward position. Pressure in line 357 will stop at valve 317. Pressure in line 327 will hold the plunger of valve 76 in its leftward position. Thus, cylinder 23 is connected to the exhaust. Simultaneously pressure from the line 348 will, in the position of the parts shown in FIGURE 1a, pass through the valve 84 and thence by the passageway 369 to the rightward end of the auxiliary cylinder 62. This continues holding the auxiliary transmission parts in the direct drive position shown in the drawings wherein the gear 51 is clutched to the auxiliary main shaft 57. Also, pressure flows from the line 348 by the lines 350 and 270 to the port 277 for supplying a constant pressure through the port 277a to one of the conduits 403 and 404. In the position of the parts shown in FIGURE 1a, the pressure is in this manner supplied to the conduit 404 and, thus, to the port 218 of the inhibitor R. However, since the restrictor rod 209 is already in the leftward position, the plunger 214 is unable to respond to the pressure at port 218. Pressure in line 351 passes through line 352 to the port 281 in the rocker member 273 and thence to the port 374 and thence by the conduit 373 to the lower end of the auxiliary relay 84 by which the core of said relay is held in the upward position as shown. A further supply is also connected by the lines 348 and 391 to the passage 266 of the selector valve S whereby to supply fluid pressure to both of the ports 261 and 262 thereof. However, in the neutral position of the apparatus, neither of the ports 261 nor 252 is connected to other ports in the inner circle II of said valve and thus none of the shift cylinders in the detector portion of the apparatus is energized.

(b) *Shift from neutral to first gear*
(VEHICLE AT STANDSTILL)

The selector S is first placed in its first gear position by repeated depression of the downshift valve 234 and consequent counterclockwise rotation of the selector S until the port 257 communicates with the line 381 as the same appears in FIGURE 1b. Thus, each depression of the downshift valve 234 energizes the line 343 which energizes the cylinder 306 and moves the pawl 303 rightwardly to effect a counterclockwise rotation of the rotor 244 one increment. Release of the downshift valve permits the cylinder 306 to exhaust through the exhaust port of said valve and resets same for a subsequent actuation. As the point 291 approaches the leg 283 of the rocker 273 (the position shown in FIGURE 1d) it will upon the next actuation of rotor 244 shift said rocker into the position appearing in FIGURE 1b and thereby shift the port 277a into connection with the line 403 and shift the port 280 into connection with the line 375.

This connection of the port 277a with the line 403 applies pressure to the port 222 and moves the plunger 216 upwardly while relieving pressure from the port 218. With the supply relay valve 83 still in its neutral position, pressure is applied through the lines 351 and 352 to the port 281 and thence by the port 280 to the upper end of the auxiliary relay 84 for moving same into its lower position. This connects the lines 348 and 350 to the line 372 and thus pressurizes the leftward side of the auxiliary shift cylinder 62 and relieves pressure from the rightward side of said cylinder.

Therefore, pressure urging a rightward, that is a reduction, shift of the auxiliary transmission is applied thereto and the shift is effected either immediately or as soon as conditions within the auxiliary transmission make such shift mechanically possible.

It should be stated here that if the selector valve S was not previously left in neutral position, the initial movement of either the upshift or the downshift valves 233 or 234 would act through the valve 341 to pressurize the line 346 and thus move said valve 83 rightwardly. This will connect line 351, and the other lines connected thereto, to exhaust. In this case, when the first gear poistion is attained by rotor 244, the shift valve 235 would be depressed to shift valve 317 to the right to thereby return the shift rods to neutral and move the valve 83 to its leftward position.

When the first gear position is attained by the rotor 244, and the port 257 is connected to the line 259d, pressure is applied through said port and line 381 to the shift cylinder 32 urging the rod 17 rightwardly. However, pressure is still on the neutral cylinder 46 and this pressure overcomes that in the shift cylinder 32, due to the larger diameters of the neutral cylinder 46 as compared to the several shift cylinders, and the rod 17 does not move.

Continuing to consider the apparatus for illustrative purposes as installed in a vehicle, such as a highway truck or an earth moving machine, the apparatus is now to be started from its standstill position and a shift from neutral into first gear is to be effected.

The operator first depresses the "start" valve 232 to introduce pressure into the line 358. This pressure is introduced into the rightward end of a neutral relay 317 and move same leftwardly, or holds it leftwardly if, because of its previous condition of operation, it is already in its leftward position as shown in the drawings. This closes the line 357 and exhausts the lines 78, 79 and 356 together with the clutch cylinder 23 and the neutral cylinder 46. This also exhausts the chamber 212 of the inhibitor valve which is connected to the line 356 and hence exhausts line 400 and the leftward end of cylinder 123, thereby permitting piston 122 to return to its leftward position ready for the next shift.

Inasmuch as the operator will continue to hold the clutch open by the foot pedal, exhausting of the clutch cylinder 23 will have no effect on the apparatus. However, the exhausting of the neutral cylinder 46, inasmuch as pressure is already on the first gear shift cylinder 32, as above described, will permit rightward movement of the shift rod 17 and the gear 10 associated therewith for engaging the first speed gear 6 with the main shaft 3 of the transmission. Thus, the shift into first gear in the main transmission is made, or will be completed if the clutch teeth interfere with each other, as soon as the clutch is engaged by the operator to commence rotation of the gear members. Likewise, with shifting pressure already on the leftward end of the auxiliary shift cylinder 62 commencement of the rotation of parts will permit shifting of the auxiliary to be completed, if it has not already been effected, and the vehicle is in first gear position.

(c) *Shift from first to second speeds*

With the vehicle now operating in first gear position, and it being desired to shift same into its second gear position, the upshift valve 233 is depressed once to shift the rotor 244 clockwise one increment. Depression of the valve 233 energizes the line 338 which energizes the line 339 and thereby energizes the cylinder 304 to move the pawl 302 rightwardly. This effects one increment of rotation of the selector valve S in a clockwise direction to place the port 257 thereof in communication with the conduit 379. Simultaneously the pressurizing of line 338 moves the ball 342 downwardly and establishes communication between the line 339 and the line 346. This pressurizes the supply relay valve 83 and moves the core thereof rightwardly. Simultaneously a constant fluid pressure supply from line 348 passes through line 391 to the circle II and thence through passageway 266 to the port 261, thence through the port 263c to the second speed cylinder 109 of the detector unit. This will effect a shifting of the rod 103 rightwardly and a connection of the shaft 92 with the shaft 112 in relationship corresponding to the speeds of the second gear ratio in the main transmission.

Movement of the valve 83 rightwardly exhausts the line 351 which accomplishes several things, namely:

a. Depressurizes the line 365 and the spring 80 effects a movement of the valve 76 into its rightward position, b. Exhausts the line 264 in the rotor, c. Acts through the line 352 to exhaust pressure on the port 281, d. Also depressurizes the line 354 and thereby the rightward end of the detector valve 123.

When the operator is ready to effect the shift, he depresses the shift valve 235. This pressurizes the line 344 and, in a manner explained in more detail in United States Patent No. 3,103,826, this first pressurizes line 295 and moves the core of the neutral relay valve 317 rightwardly. As pressure builds up in line 205, this acts against the piston 202 to move same against the urging of spring 203 into its full upward position where pressure from line 344 holds the core of valve 197 while pressure from line 205 exhausts through exhaust 206. When the operator releases the shift valve 235, the line 344 exhausts and the valve 197 returns to its normal position.

The rightward shifting of the valve 317 introduces pressure fluid from the line 357 into both the lines 78 and 356. In view of the rightward position of the valve 76, pressure from line 78 passes through the valve 76 and pressurizes the line 366 and thereby the clutch cylinder 23. This disengages the clutch 19. Simultaneously pressure from line 357 pressurizes line 356 to energize the neutral cylinder 46 for returning the main gear parts to their neutral position. Pressure in line 356 is also conducted by line 405 to the upper end of the chamber 212 in the inhibitor valve R and thence to the passageway 406, chamber 213 and passageway 400 to the leftward end of the valve 123 in detector D (the valve 216 being held open by the rod 209 being in its rightward position and the valve 214 being permitted to open by the line 404 being open to the atmosphere). This urges the piston 122 thereof rightwardly until the internal splines of sleeve 119 engage the blocker teeth of the blocker structure 133.

This being an upshift, it will be recognized that the engine speed as appearing on shaft 1 will be considerably greater at the commencement of the shifting operation than it will be when said shifting operation is completed. In other words, assuming the output shaft 57 remains at constant or substantially constant speed, and since no shift will take place in the auxiliary transmission, the speed of the main shaft 3 of the main transmission will remain substantially constant and the speed of the input shaft 1 will be substantially reduced. Since the speed of shaft 1 will be reflected through the connection X to the shaft 126, and since the leftward movement of the detector shift rod 103 has already effected a ratio change in the detector so that the rate of rotation of the sleeve 119 is substantially slower than it would be under conditions of first gear connection, the sleeve 119 will be blocked by the second blocker 167 of the speed comparator unit 133. In this position, passageway 407a is aligned with port 364.

Release of the clutch 19 releases the transmission torque allowing the pressure already in cylinder 46 to return shift rod 17 leftwardly to neutral. When the shift rods of the main transmission reach neutral, valve 83 is moved to its leftward position with the following results.

a. Pressure is applied to line 351, thence through line 327, passage 264, opening 257 and line 379 to cylinder 31 to urge shift rod 17 leftwardly. However, since pressure is still present in cylinder 46, no movement of the rod 17 occurs.

b. Pressure is applied through line 365 to the rightward end of valve 76. Simultaneously pressure in neutral cylinder 46 travels through the line 405, through the valve chambers 212 and 213 to and through the line 400 to move the piston 122 rightwardly as far as possible until it is stopped by the blocking mechanism 133. Since the passageway 407a is aligned with the port 364, pressure from the line 351 travels through the lines 352 and 354 to the rightward end of the passageway 407 thence through the port 364 to and through the conduit 363 to the leftward end of the valve 76 to balance the pressure applied thereto from the passageway 365. Thus, in all positions excepting those range shifts where the action of the inhibitor R occurs as described hereinafter, the core 82 of the valve 76 will remain in its rightward position and the clutch will remain disengaged. If the pressure is a little slow in moving through the several passageways required to enable it to reach the lefthand side of the valve 76, the spring 80 will tend to hold the valve 82 rightwardly until the pressure in line 363 has time to build up. At most, even if the pressure in line 363 still lags sufficiently to permit the valve 82 to move leftward, it will be only momentary so that the clutch cylinder 23 will be de-energized only momentarily and the clutch thereby engaged for only an instant. If this happens, no harm will be done since the clutch will be immediately again disengaged when pressure in line 363 supplemented by the spring 80, returns the valve 82 rightwardly.

c. Pressure is applied through line 352 to lines 353 and 354. Pressure in line 353 passes through openings 281 and 280 to line 375 to hold the core of valve 84 in its lower position. Pressure in line 354 passes through passageway 497 and through the port 364 to the line 394 from which it goes to the relay valve 75 for actuating same and thereby energizing the countershaft brake cylinder 26. This applies the countershaft brake 24 and the countershaft, being connected through the gear 2 to the shaft 1, rapidly diminishes the speed of these parts toward the speed necessary to complete the shift into second speed gear. As the speed of shaft 1 diminishes, a corresponding diminishing speed is applied through the connection X and the gear 131 to the blocker 167. At a suitable point ahead of the actual synchronization of the main transmission gears, as set forth more fully in Patent No. 2,943,719, the sleeve 119 will move into its fully rightward position.

As synchronization is reached in the detector unit, the sleeve 119 now moves further rightwardly and connects the core passageway 407 of the valve 123 to the port 362 thereof. This pressurizes the line 361 which pressurizes the rightward end of the valve 317 and moves the core thereof to its leftward position. This connects both the line 78 and the line 356 to the exhaust through the valve 317. Exhausting line 356 and thereby the neutral cylinder 46 permits the pressure already present in the second gear shift cylinder 31 to move the rod 17 leftwardly, and thereby move the gear 10 into engagement with the gear 5 whereby to put the main transmission into its second gear position. Simultaneously the exhausting of the line 366 permits the clutch cylinder 23 to become exhausted and permits the clutch to re-engage.

If desired, a restrictor may be placed in the line 366 to insure reengagement of the clutch 19 only after completion of the shift into second gear position, but this is normally unnecessary.

Exhausting of the neutral cylinder 46 also effects exhausting of the line 405 and parts connected therewith. The shift into second gear is now completed.

(d) *Shift from second to third and third to fourth*

These shifts are substantially the same as shift from first to second and need no special description.

(e) *Shift from fourth to fifth (including range shift)*

It is in this shift from fourth to fifth that the range shifting of the auxiliary takes place. Accordingly, this is the operation in which the inhibitor structure R is caused to function and in which the predictor system described above is combined with the range shifting concept also referred to above.

Commencing a shift from fourth to fifth, the rotor 244 is in the position shown in FIGURE 1c wherein the port 257 is in communication with the conduit 377, and the point 292 is adjacent the leg 284 of the rocker 273. With the next movement of the rotor in clockwise direction, in response to actuation of valve 233, the same assumes the position as shown in FIGURE 1d wherein the port 258 is now in communication with the conduit 381, opening 277a is in communication with line 404 and opening 280 is in communication with line 373.

While the connection of the port 258 to the line 381 will prepare the system for shifting in the manner above described in connection with the shifting into first gear, it will not go further and effect an actual shift until further signal by the actuation of the shift valve 235. However, movement of the rocker 273 into the position shown in FIGURE 1d will immediately connect the port 280 to the line 373 and thereby move the core of the auxiliary relay valve 84 upwardly as soon as the line 352 is energized.

Actuation of the upshift valve 233, in the manner above described, will not only pressurize the cylinder 304 for effecting an upshift or clockwise movement of the rotor 244 and shifting of rocker 273, but will also pressurize the line 346 and move the core of valve 83 rightwardly in the same manner and with the same results as discussed in connection with the first-to-second gear shift. This effects exhausting of the lines 351, 327 and 352. Pressure from line 348 is applied through line 391 to the passageway 266, thence through port 262 to the connection 263d which connects to the shift cylinder 108. This urges the rod 103 leftwardly.

The only significant difference at this point from the operation performed in the shift from first gear to second gear is that the rocker 273 connects the constant pressure fluid supply in line 270 through the opening 277a to line 404 in housing 207. to the port 218 in housing 207. This urges the plunger 214 thereof upwardly. When the transmission is in fourth gear, the sleeve 58 is meshed with gear 56 and piston 61 and rod 59 are at the rightward end of their travel. Thus, the plunger 214 is free to move upwardly and does so, blocking port 219. This blocks pressure fluid from the line 405 from entering the line 400 and at the leftward end of the valve 123 until after shifting of the auxiliary cylinder 62 is completed. Said shifting is initiated as above mentioned upon the appearance of pressure in the rightward end of the auxiliary shift cylinder 62.

With the system thus made ready for the shift, the shift valve 235 is depressed at the will of the operator when he is ready to effect the shift from fourth to fifth position. This energizes the line 344 and the pressure fluid appearing therein passes through the pulse valve 197 and thence by the line 205 to the neutral relay valve 317 to move said valve rightwardly. As soon as pressure builds up in the line 205, it moves the pulse valve 197 upwardly as above described for exhausting the line 205. When the shift valve 235 is released by the operator, it returns to the position shown in the drawing and the line 344 is exhausted.

Rightward movement of the neutral relay valve 317 energizes the line 78 and thence, because of the rightward position of the clutch relay valve 76, so held by the spring 80, the line 366 is energized and the clutch cylinder 23 activated to open the clutch 19. Simultaneously, the pressure fluid in line 357 energizes line 356 which actuates the neutral cylinder 46 to move the main transmission into its neutral position. Pressure fluid in the line 356 also passes through the line 405 to the port 217. However, it is blocked at that port by the upward position of the plunger 214 which is so held by the constant pressure from the line 404 supplied through the rocker 273 from the line 270. As soon as the main transmission comes into neutral, and the supply relay valve 83 is thereby moved leftwardly, the supply in line 347 is connected to the line 351 and pressurizes the following:

a. Line 327 which goes through line 264 and port 258 to line 381 and thence pressurizes the shift cylinder 32.

b. From line 327 to line 365 which moves the clutch relay 76 leftwardly, exhausting said clutch and permitting it to re-engage, pressure in line 363 being this time blocked by the leftward position of valve core 122 (in valve 123) which has not yet been moved rightwardly due to the blocking of the pressure in line 405 by the inhibitor R.

c. Line 352 which energizes port 280 of the rocker 273 thereby moving the auxiliary relay valve 84 upwardly which connects the constant pressure appearing at port 367 to the line 369 which imposes pressure on the rightward end of the auxiliary shift cylinder 62.

d. Line 352 also energizes line 354 which supplies the rightward end of the detector valve 123 and thereby passage 407a.

Pressure at the rightward end of the auxiliary shift cylinder 62 urges the sleeve 58 leftwardly and, since the main transmission is now in neutral, the pressure on the reduction clutch between the sleeve 58 and the gear 56 will be released so that said sleeve 58 can shift out of reduction connection and toward direct connection. This will engage the synchronizer 50 and as soon as the parts are brought into synchronous condition, the leftward movement into direct position will be completed. As the rod 59 continues its leftward movement, the bevelled surface 211a will act against the corresponding surface on the plunger 214 and pull it downwardly. This will connect the port 217 with the port 219 and thus permit pressure from the line 205 to travel into the line 406 to the chamber 213. There being no pressure at the port 222, the pressure appearing above the plunger 216 will hold it downwardly and thereby connect the port 221 with the port 223. This pressurizes the line 400 and thereby pressurizes the leftward end of the detector valve 123. This moves the core of said valve rightwardly and thereby effects engagement of the sleeve 119 against the blocker member 167. As set forth in more detail in Patent No. 2,943,719, this connects the passage 407a with the port 364 and thereby pressurizes the line 394. This pressurizes the brake relay 75 which energizes the brake cylinder 26 and applies the countershaft brake. Simultaneously it pressurizes through line 363 the leftward end of the clutch relay 76 and again moves the core thereof into its rightward position for energizing cylinder 23 and thereby opening the clutch 19. Application of the countershaft brake rapidly slows the shaft 1 to a point where synchronization is substantially approached and the relative speeds of the gears will be reflected through the connections X and Y in the shafts 126 and 92, respectively, of the detector unit. This, as described in detail in Patent No. 2,943,719, will unblock the blocker 167 at a point shortly before actual synchronization of the fifth speed gears in the main transmission, namely, the gear 6 and the countershaft gear connected therewith, and permit further rightward movement of the sleeve 119 and of the core 122 of the detector valve 123. This connects the rightward end of the detector valve 123 with the port 362 and thereby pressurizes the line 361 associated therewith. This pressurizes the rightward end of the neutral relay valve 317 moving same leftwardly which cuts off the supply line 357 for both the clutch and the neutral cylinder 46. The clutch is thereby permitted again to re-engage and the neutral cylinder is exhausted through the exhaust port of the neutral relay 317 which latter also exhausts the clutch cylinder 23. The neutral cylinder being exhausted, the pressure in cylinder 32 now effects rightward movement of the rod 17 and the shift into fifth position is completed.

It will be further observed in the foregoing description that while the main transmission is in neutral position, it is maintained the same as in the sequence set forth in Patent No. 2,637,221, but that the completion of the shift in the main transmission and in fact the application of the countershaft brake to cause synchronization in the main transmission is delayed by the inhibitor structure R until after the shift of the auxiliary unit is completed.

(f) *Upshifts from fifth through ninth*

These will continue to be selected by appropriate manipulation of the upshift valve 233 and the shift initiated by the movement of the shift valve 235 in the manner above set forth and no further detailed description thereof will be necessary. Here the leftward position of the rod 209 holds the valve 214 open and line 403 being open to the atmosphere permits valve 216 to open, whereby the inhibitor R remains inoperative until the next range shift.

(g) Downshift from ninth through fifth position

The downshift from ninth through fifth position is sufficiently similar to the shift from fifth to fourth position that no detailed description will be needed. Rather, the same will be sufficiently described by the reference to the more complex downshifting operation from fifth to fourth position, and reference is accordingly made thereto. The inhibitor R remains inactive as above stated.

(h) Downshift from fifth to fourth position

Downshifting from fifth to fourth position is initiated, as are all other downshift movements, by depression of the downshift preselect valve 234. This energizes the cylinder 306 which acts through the pawl 302 to move the rotor 244 one increment counterclockwise as appearing in FIGURES 1a–1d, inclusive. This causes the corner 291 of the notch 286 of rotor 244 to engage the leg 283 of the rocker 273 and rotate it counterclockwise into the position shown in FIGURE 1c. Simultaneously the port 257 is now connected to the line 377 and the port 261 in the circle II of valves is connected to the port 263a. Line 391 and therefore port 261 being connected to constant supply, this immediately pressurizes cylinder 107 of the detector unit D. Simultaneously line 270 also being connected to constant supply, this pressurizes through port 277a of the rocker 273 the line 403 and thereby pressurizes the port 222 of the inhibitor R, thereby moving the plunger 216 thereof into its upper position for blocking the port 223. The line 404 is by this operation depressurized so that the plunger 214 is free to move downwardly away from the port 219.

Pressurizing of the line 346 by the actuation of the downshift valve 234, moves the core of supply relay valve 83 rightwardly. This connects the line 351 to exhaust to insure the exhausting of the several lines associated therewith.

The shift is again initiated by the depression of the shift valve 235 which provides a pulse of pressure fluid through line 205 to move the core of valve 317 rightwardly. This, as before, pressurizes both of the lines 78 and 356. The core of valve 76 being held rightwardly by the spring 80, pressurizing line 78 energizes the clutch cylinder 23 and opens the clutch 19. Simultaneously pressurizing of the line 356 pressurizes the neutral cylinder 46 and moves the main transmission into its neutral position.

Movement of the main transmission into its neutral position moves the core of valve 83 leftwardly and thereby pressurizes line 351 and the several parts connected therewith, namely, the rightward side of clutch relay 76, port 257 in the rotor 244, port 280 in the rocker 273 and the rightward side of detector valve 123. Pressurizing the rightward side of the clutch relay 76 moves the core 76a thereof leftwardly and thereby depressurizes the clutch cylinder 23 for re-engagement of the clutch. Pressurizing of the port 280 pressurizes the upper end of the auxiliary relay valve 84 and moves same into its downward position whereby the constant pressure at port 367 pressurizes line 372 which pressurizes the leftward end of the auxiliary shift cylinder 62. This urges the auxiliary transmission sleeve 58 rightwardly.

Pressurizing of the line 356 also pressurizes the line 405 which pressure appearing at the port 221, is blocked by the plunger 216 which is in its upper position as above described.

When the main transmission reaches neutral position, pressure is released from the direct connection clutch teeth of the auxiliary transmission and the sleeve 58 is enabled to move rightwardly in response to the pressure at the leftward end of the auxiliary shift cylinder 62. Upon such rightward movement the synchronizer 55 is engaged and as soon as synchronization is completed the rightward shift of the auxiliary transmission is completed. The completion of such rightward shift causes the cam 211b to bush the plunger 216 downwardly and thereby connect port 221 with port 223 for pressurizing the line 400 and thereby pressurizing the leftward end of the detector valve 123. This moves the core 122 of valve 123 rightwardly. This time the sleeve 119 is stopped by the blocker 174, as set forth in more detail in Patent No. 2,943,719, so that the passageway 407a does not align with the port 364. Thus, there is no pressure appearing in line 394 to energize the countershaft brake nor is there any pressure appearing in line 363 to move the core 82 of the clutch relay 76 rightwardly. Accordingly, the countershaft brake remains disconnected and the clutch remains connected, whereby the operator may use the engine to accelerate the input shaft 1 of the main transmission in the usual manner.

With such acceleration, synhronization of the fourth speed gears in the main transmission is approached and at a suitable time prior to attainment thereof, through the connections X and Y as set forth in detail in Patent No. 2,943,719 the blocker 174 will unblock and rightward movement of the sleeve 119 will continue. The rightward movement will be sufficiently rapid that nothing will happen when the port 407a passes the port 364 but same will align with port 362 for pressurizing the line 361. This provides the shift signal in the same manner as above set forth and effects a left-ward movement of the core of neutral relay valve 317.

Since the clutch cylinder 23 is already de-activated, leftward movement of the core of valve 317 will have no effect upon said clutch cylinder, but the line 356 will be depressurized through the valve 317 and thereby depressurize the neutral cylinder 46. The depressurizing of said neutral cylinder 46 will permit the pressure in cylinder 33 to move the rod 16 leftwardly and thereby effect engagement of the sleeve 9 with the input gear 2 to complete the shift into fourth speed.

Again, it will be seen that inhibitor unit R will prevent synchronization and shifting of the main transmission until after completion of the shift in the auxiliary transmission.

(i) Reverse

For reverse operation, the downshift valve 234 will be further actuated until the port 258 is in register with the port 384.

This being in effect another start from a standstill position, the operator will now actuate the shift valve 235 to return the main transmission to neutral condition and then actuate the start valve 232 and the sequence will proceed in the same manner as above described for a start from standstill into first gear position.

The rocker 273 being in its FIGURE 1c position, the auxiliary will be in its reduction position as above described in connection with first gear position. Thus, only one reverse speed ratio is provided in the embodiment illustrated in FIGURE 1a.

If, however, it is desired to have two reverse speed ratios available, then the selector S may be modified as shown in FIGURE 5a and further illustrated in FIGURE 1e for the purposes of easier comparison with FIGURES 1a–1d. Here a protuberance 411 is provided on the leg 284 and a second notch 412 is provided in the rotor 244 as shown. Thus, continued counterclockwise movement of the rotor 244 past the above-described reverse position by repeated actuations of valve 234 will bring the point 291 against the protuberance 411 to move rocker 273 again into its FIGURE 1d position with the notch 412 receiving the leg 283. At this time opening 257 will communicate with port 384. This shifting of the rocker 273 into its FIGURE 1d position will for reasons already fully explained above shift the auxiliary relay 84 into its upper position and thereby pressurize the rightward end of the auxiliary shift cylinder 62. Since the mechanism is at a standstill, and the operator has the clutch pedal depressed, there will be no pressure between the reduction clutch teeth of the auxiliary rear group restraining the immediate shifting of said auxiliary gear group and the pressure appearing on the rightward side of the auxiliary shift cylinder will effect immediate shifting of the auxiliary system into its direct drive position. If the main gear group has been left in a shifted position, the driver will now depress the shift valve 235 which will, in the manner above described in detail, pressurize the neutral cylinder 46 and thereby effect a shifting of the main transmission into its neutral position. This will pressurize the line 327 which will pressurize the passageway 264 and the port 257 and thereby continue pressurizing the shift cylinder 36. Depression of the start valve 232 will now effect the leftward shifting of the neutral relay 317 which depressurizes the neutral cylinder 46 and permits the pressure in cylinler 36 to effect a shifting into the second reverse position. The transmission is now in reverse position insofar as the main transmission is concerned and the auxiliary in its direct drive position whereby a second reverse gear ratio is provided.

To return to first reverse gear ratio or to first gear, the upshift valve 233 is actuated effecting a clockwise rotation of the rotor 244. This causes the surface 413 of the lotch 412 back against the leg 283 of the rocker 273 to restore said rocker to its FIGURE 1c position. This returns the rocker 273 into its reduction position as shown in FIGURE 1c for either low speed reverse or commencement of entry into first gear position as desired.

While the foregoing has described a normal operation of the apparatus, provision is also made for certain abnormal operations by which the apparatus is protected from damage. Inasmuch as the problem exists primarily in a downshift sequence, attention will first be directed toward that.

It is possible in a downshift sequence involving a range shift and if the operator holds the accelerator down so as to increase the engine speed very rapidly, that the engine speed will increase past the point of synchronization while the main transmission is in neutral due to the time required for the shifting sequence to take place, particularly the extra time required for the shifting of the auxiliary transmission. If this happens with the clutch disconnected, the parts will be reconnected with considerable shock which may seriously damage the clutch faces or portions of the transmission. However, by holding pressure on both ends of the clutch relay 76 as above described in connection with a range shifting downshift, until the shift in the auxiliary has taken place, the clutch remains engaged and the input shaft 1 remains connected to the engine shaft 21. Thus, if the engine increases in speed to such as extent that the engine connected gears are running faster than their proper synchronous speed, the relations between the gears about to be engaged will be the same as in an upshift and accordingly an upshift signal is given by the detector unit D. This in the same manner as above described in connection with an upshift applies the countershaft brake 24 and slows the shaft 1 and parts connected therewith sufficiently that a smooth shift can be made.

Similarly, on an upshift it is conceivable that the same type of situation could arise, such as by cold oil in the crankcase slowing the countershaft gears excessively. In such case, the engine connected parts must be increased in speed which is the same situation which occurs in a downshift. Thus, by holding the clutch 19 engaged throughout the auxiliary shifting of the range shift pattern, the relationship of the detector unit to the speed-sensing devices X and Y will be such as to give the shift signal at the proper time with respect to bringing together of the main transmission elements.

Thus, for both upshifts and downshifts the clutch remains connected in a range shift sequence until after the completion of the auxiliary shifting step and the likelihood of damage to the clutch due to overrunning of the synchronous speed by one or the other elements of the two elements about to be engaged is prevented.

In certain cases the auxiliary transmission utilized in a system as above described may be of a type wherein the ratios are attained by means, such as magnetic clutches, utilizing movement less than that required for reliably operating valves of the nature of valves 214 and 216. An example of such apparatus would be magnetic clutches operating in response to pressure appearing in the lines 369 and 372 as in the apparatus above described but requiring only very limited movements. In such cases, and sometimes for other reasons, it is desirable and possible to delay the conduction of pressure fluid from the line 405 to the line 400 by time controlled means, the time being selected at a sufficient value to insure the successful shifting of the auxiliary transmission within such time and therefore safely before the shifting of the main transmission.

One typical and successful embodiment of such apparatus is shown in FIGURE 18, which represents a device identical with that shown in FIGURE 1a excepting for the replacement of the mechanical inhibitor R by a pressure actuated inhibitor R'.

Those parts of the apparatus shown in FIGURE 1a which appear also in FIGURE 18 are designated by the same numerals as utilized in FIGURE 1a and hence will need no description other than that necessary to describe the pneumatically operated inhibitor here used in the manner of its connection to the system in place of the mechanical inhibitor R above described in connection with FIGURES 1a to 17.

A pressure fluid operated valve 501 has an inlet 502 which is normally closed by any convenient means, such as a spring 503, has its outlet 504 normally connected to exhaust port 506 and is actuated by the appearance of pressure at port 507. While many available valves are effective for accomplishing this purpose, including the valve shown in FIGURE 5 of U.S. Patent No. 2,934,185, the schematic representation appearing in FIGURE 18 and above described will sufficiently illustrate the invention which may then be practiced as convenient by whatever particular valve mechanism is desired. Said valve 501 has its inlet connected to the line 372 and its pilot port 507 connected to the line 403. Its outlet port is connected by a line 508 to a shuttle valve 509 having ports 511 and 512 which are alternately and automatically closed by a ball 513, and an outlet port 514. The port 512 is connected by a conduit 516 to the outlet port of a further valve 517. The inlet of said last-named valve is connected to the line 369 and the pilot port thereof is connected to the line 404.

Returning now to the valve 509, its port 514 is connected through an orifice 518 into a chamber 519 within the tank 521. Said chamber 519 is connected by a conduit 522 to the pilot port of a valve 523 whose inlet is connected to the line 405 and whose outlet is connected to the line 400. The exhaust ports of each of the valves 501, 517 and 523 communicate with the atmosphere.

The operation of the transmission fitted with the pressure fluid inhibitor R' is generally similar to that shown in FIGURE 1a excepting that the blocking of fluid flow from the line 405 to the line 400 is here controlled in terms of a predetermined time value, rather than, as in the form of FIGURE 1a, by the movement of the auxiliary shift rod itself.

Assume, as in the example of FIGURE 1a, that the auxiliary shifting function occurs in a shift between fourth and fifth position (the shifting of the FIGURE 18 form being identical with that of the FIGURE 1a form in those speeds where the auxiliary transmission does not shift) and with the rocker 273 in its fourth gear position as shown in FIGURE 1c. Throughout the shifts from first through fourth gear, and with the rocker arm in its FIGURE 1c position, pressure is held continuously in line 403 which holds valve 501 rightwardly. Valve 84 being held downwardly which holds line 372 pressurized, pressure is transmitted through valve 501, valve 509 and line 522 to hold valve 523 leftwardly. Thus, the connection between line 405 and line 400 is uninhibited and the inhibitor R' does not function until the rocker 273 is moved by the occurrence of a range shift.

Upon preselection of the apparatus to fifth gear position by actuation of the valve of the upshift selector valve 233, in the manner above described, the rocker 273 is moved into its FIGURE 1d position which now opens line 403 to the atmosphere, pressurizes line 404 and also connects port 280 with the line 374. The opening of line 403 to the atmosphere depressurizes the pilot port of the valve 501 and permits it to return to its normal position thereby connecting the line 508 to exhaust and thereby exhausting the pressure fluid from the chamber 519 and from the pilot port of the valve 523. The constant pressure from the line 270 now being supplied to the line 404, the valve 517 is moved leftwardly to its open position but inasmuch as there is not yet any pressure in the line 369, nothing further happens.

The shift valve 235 now being depressed, the apparatus functions in the manner above described in connection with FIGURES 1 to 17, inclusive, which results in the pressurizing of the line 369.

The appearance of pressure in line 369 now moves the ball 513 to the seat adjacent port 511 and the pressure fluid flows through the orifice 518 into a chamber 519. As the chamber 519 fills, a sufficient pressure to actuate the valve 523 will eventually appear at the pilot port thereof to open said valve at a predetermined time following the appearance of pressure in the line 369.

In the meantime the return of the main transmission to neutral position as above described causes pressure to appear in line 405. So long as the valve 523 is closed, the pressure in line 405 is blocked from entering the line 400 and it is accordingly blocked from actuating the detector valve 123. This prevents said detector from giving a shift signal to the main transmission and thereby prevents shifting of the main transmission until the elapsing of the period of time required to bring the pilot port of the valve 523 up to its predetermined actuating pressure. When said pressure is attained, the valve 523 opens and pressure flows from the line 405 to the line 400 and thence to the detector 123. The remainder of the operation is the same as that above described in connection with FIGURES 1, 2 and 12.

Continuing upshifts from fifth through the uppermost position proceeds as with FIGURES 1 to 17 form with the pilot port of valve 523 remaining pressurized by pressure from line 369 coming through valve 517 (held open by continuing pressure on line 404), valve 509 and line 522 so that the inhibitor R' remains inactive until the next range shift.

On the downshifts the procedure is reversed with the inhibitor R' again functioning at the range shift in response to the moving of the rocker 273. Since all of this is either the same as that above described in connection with the FIGURES 1 to 17 form, or merely the reverse of that above described for the upshifting of the FIGURE 18 form, further detailing of the operation of this modification is unnecessary.

While all of the foregoing discussion has been in terms of range shifting auxiliary ratios, it will be apparent that both the principles and apparatus may be readily modified to provide a "splitter" type of auxiliary. Since the manner of doing this will be apparent to those skilled in the art in the light of the foregoing, a detailed description of this type of apparatus is unnecessary and will be omitted with the understanding, however, that the invention applies also thereto.

Although a particular preferred embodiment of the invention has been disclosed above in detail for illustrative purposes, it will be understood that variations or modifications of such disclosure, which lie within the scope of the appended claims, are fully contemplated.

What is claimed is:

1. In a transmission control device for a transmission including a main unit of shiftable toothed elements and an auxiliary unit of shiftable toothed elements, said auxiliary unit being serially connected to said main unit, and wherein said control device utilizes a manually operable selector device associated with power shifting means for shifting said units into selected ratios upon appropriate selection in said selector device, an automatically operable detector unit for detecting the speeds of the toothed elements of said main unit about to be interengaged and for giving a signal when said speeds are in a nonsynchronous condition but are approaching synchronization, means responsive to a signal from said detector unit for effecting the shifting operation of said main unit, the improvement comprising:

neutralizing means for placing said main unit in neutral position;

means for thereupon energizing said power shifting means for urging said auxiliary unit toward one ratio or toward another ratio in response to a preselected movement of said selector device from a selected position calling for one ratio in said auxiliary to a selected position calling for another ratio in said auxiliary;

inhibitor means for preventing the shifting of said main unit from neutral positions until substantial interengagement of the interengageable elements of said auxiliary;

release means thereupon de-activating said inhibitor means and permitting the shift in the main unit to proceed;

whereby the shifting of said main unit will take place after entry of the auxiliary unit substantially into its shifted position.

2. The device defined in claim 1 wherein the mechanical movement of the auxiliary unit entering into its shifted position is utilized to de-activate the inhibitor means.

3. The device defined in claim 1 including means deactivating said inhibitor means following a predetermined period of time sufficient to permit normal completion of the auxiliary shift.

4. The device defined in claim 1 wherein said neutralizing means includes a neutral cylinder associated with said main unit operative to hold said main unit in neutral position for so long as same remains energized, and including a valve associated with said detector unit responsive to the appearance of pressure within said neutral cylinder and an inhibitor valve interposed between said neutral cylinder and said detector unit valve, said inhibitor valve delaying the transmitting of pressure from said neutral cylinder to the detector unit for a period of time sufficient to effect interengagement of the interengageable elements of said auxiliary unit.

5. The device defined in claim 1 wherein said inhibitor means includes a pair of abutments movable with the shifting of said auxiliary unit and means responsive to the positioning of said selector device for interposing a selected one of said abutments as an obstacle to prevent shifting of said main shifting unit during the shifting of said auxiliary unit, and means removing said obstacle upon the substantial attainment of shifted position by said auxiliary unit.

6. The device defined in claim 1 including a rod movable longitudinally with shifting movement of said auxiliary unit, said rod having portions defining a pair of oppositely directed cammed abutments, and said inhibitor means including a pair of valve plungers positioned transversely to said rod and having cammed surfaces, the cammed abutments of said rod cooperating with the cammed surfaces of said valve plungers for controlling the position of said valve plungers in response to movement of said rod, whereby commencement of the synchronizing sequence of the main transmission can occur only after substantial completion of the shifting of the auxiliary unit.

7. A shifting control for a change speed transmission having a first change speed gear group and a second change speed gear group connected in series with said first group, comprising:
independent means for shifting said first and second groups, means for detecting the speeds of a given set of toothed elements of said first group which are about to be interengaged, said detecting means including signalling means for giving a shifting signal for said set when said set is in a nonsynchronous condition but is approaching synchronization on either an upshift or a downshift; and
means for causing, when the shift involves a shifting of the second gear group, said signaling means to give a shifting signal only after the commencement of interengagement of the interengageable elements of the second gear group.

8. A shifting control for a change speed transmission having a first change speed gear group and a second change speed gear group connected in series with said first group, comprising:
independent means for shifting said first and second groups, means for detecting the speeds of a given set of toothed elements of said first group which are about to be interengaged, said detecting means including signalling means for giving a shifting signal for said set when said set is in a nonsynchronous condition but is approaching synchronization on either an upshift or a downshift;
said signaling means being connected in series with position responsive means for said second gear group so that when the shift involves a shifting of the second gear group, operation of said signaling means follows operation of said position responsive means whereby the second group at least substantially shifted before said given set is interengaged.

9. A shifting control for a change speed transmission having a first change speed gear group and a second change speed gear group connected in series with said first group, comprising:
independent means for shifting said first and second groups;
means for detecting the speeds of a given set of toothed elements of said first group which are about to be interengaged, said detecting means including means for giving a shifting signal for said set when said set is in a nonsynchronous condition but is approaching synchronization on either an upshift or a downshift;
delay means for delaying the shifting signal from effecting interengagement of said given set when the shift involves a shifting of the second gear group until the second group is substantially shifted.

10. A shifting control according to claim 9 including means for rendering said delay means operative only when a shift is to be effected in said second group.

11. A shifting control for a change speed transmission having a first change speed gear group and a second change speed gear group connected in series therewith, the ratios of said second group being spaced apart an amount greater than the spacing of a predetermined number of ratios in the first group, comprising:
independent means for shifting said first and second gear groups;
selector means for effecting first a shifting of said first group through said predetermined number of ratios, then shifting of said second group and then repeating the shifting of said first group through said predetermined number of ratios;
means for detecting the speeds of a given set of toothed elements of said first group which are about to be interengaged, said detecting means including means for giving a shifting signal for said given set when same is in a nonsynchronous condition but is approaching synchronization on either an upshift or a downshift;
and means operative when the shift involved requires a shifting of the second gear group for modifying the operation of the signaling means so that a shifting signal is given only after the shift in the second gear group is at least substantially completed.

12. A shifting control for a change speed transmission having a first change speed gear group and a second change speed gear group connected in series therewith, comprising:
independent means for shifting said first and second groups;
preselectable means for selecting the gear ratios next to be attained in both said first group and said second group;
shift means for initiating the shifting operation;
means responsive to operation of said shift means for placing said second group in its preselected gear ratio and means automatically responsive to the substantial completion of shifting of said second group to effect placing of said first group in the preselected gear ratio.

13. A shifting control according to claim 11 wherein said shifting means for said first group and said second group are operated by fluid pressure and including selector valve means for supplying fluid pressure to said shifting means;
preselect means for changing the setting of said selector valve means to place same in position for actuating said shifting means to establish the next gear ratios to be attained in said first and second groups;
means responsive to operation of said shift means for moving said first gear group into neutral position and simultaneously supplying fluid pressure through said selector valve means to said shifting means for said second group so that said second group is placed in its preselected gear ratio; and
valve means responsive to the establishment of said preselected gear ratio in said second group for permitting fluid pressure supplied by said selector valve means to effect shifting of said first group into its preselected gear ratio.

14. A shifting control according to claim 13 in which said selector valve means is connected to supply fluid pressure to cause shifting of said first group into its preselected position as soon as said first group is placed in neutral but is prevented from doing so by a force holding said first group in neutral;
and said means responsive to the placing of said second group in its preselected ratio is connected to remove said force whereupon the shift of said first group into its preselected ratio is effected.

15. A shifting control apparatus for use with a main transmission having a plurality of selectable speed ratios and a shiftable auxiliary transmission serially operable with said main transmission, comprising:
a plurality of main shifting means for said main transmission, each of which, when actuated, is adapted to provide one of said speed ratios, said main shifting means being actuatable one at a time;
means operable while said main transmission is in one speed ratio for de-energizing the main shifting means for said one speed ratio and simultaneously energizing the main shifting means for the next speed ratio;
blocking means for preventing said last-named main shifting means from effecting establishment of the next speed ratio;
means for placing said main transmission in neutral; and
shift signalling means for producing a signal indicating the parts of said main transmission which establish the next speed ratio are in a nonsynchronous condition but are approaching synchronization; means responsive to said signal for de-energizing said blocking means whereby the previously energized main shifting means for the next speed ratio immediately establishes same;

auxiliary shifting means for shifting said auxiliary transmission and inhibitor means delaying the energization of said shift signaling means until after the auxiliary shifting means has substantially completed its shifting operation.

16. A shifting control apparatus for use with a main change gear transmission having input and output shafts and an auxiliary change gear transmission connected serially with said main transmission, comprising:

a plurality of fluid pressure operated shift rods for selectively providing the respective speed ratios of the main transmission, valve means for supplying fluid pressure to one of said shift rods at a time;

alternately operable upshift actuating means and downshift actuating means operable while the main transmission is in shifted condition for actuating said valve means for removing fluid pressure from one shift rod and simultaneously applying it to another shift rod;

neutralizing means for holding said shift rods in neutral against the contrary urging of fluid pressure applied to a selected shift rod;

shift initiating means for applying said neutralizing means;

shift signaling means responsive to the speeds of the input and output shafts of the main transmission for de-energizing said neutralizing means when the gears next to be engaged are in a nonsynchronous condition but are approaching exact synchronization whereby the fluid pressure previously applied to said another shift rod effects an immediate shifting movement thereof;

auxiliary shifting means for shifting the auxiliary transmission and inhibitor means delaying the energization of said shift signaling means until after the auxiliary means has initiated the shifting of said auxiliary transmission.

17. A shifting control for a transmission having first and second change speed gear groups connected in series with each other, comprising:

first fluid pressure operated shifting means for said first group and second fluid pressure operated shifting means for said second group;

selector valve means for controlling the engagement of the gear sets in said first and second groups;

preselectable means for actuating said selector valve means to cause same to select the gear set next to be engaged;

a detecting unit for detecting the speeds of the gear set of the first group next to be engaged, said detecting unit including means for giving a signal when the speeds of the next gear set to be engaged are in a nonsynchronous condition but are approaching synochronization;

shift activating means for applying a force urging said first group into neutral and means responsive to said first group being placed in neutral for simultaneously causing said first pressure fluid operated means to urge said gear set next to be engaged of said first group into engagement and for causing said second pressure fluid operated means to place said second group in the desired position;

means responsive to said second gear group being placed at least substantially in the desired position for operating said detecting unit and means responsive to a signal from said detecting unit for removing said force urging said first group into neutral whereby the shift of the next gear set to be engaged of the first group is completed.

18. A shifting control according to claim 17 including a clutch connected to the input shaft of the first group;

means responsive to operation of said shift activating means for disengaging said clutch;

means responsive to placing of said first group in neutral for re-engaging said clutch;

means operable on an upshift of said first group and responsive to operation of said detecting unit prior to the giving of a signal for disengaging said clutch; and means responsive to the completion of a shift in said first group for again re-engaging said clutch.

19. A shifting control according to claim 18 including a brake connected for decelerating the input shaft of the first group and means for operating said brake on an upshift when said clutch is disengaged for the second time.

20. A shifting control for a transmission having first and second gear groups connected in series with each other, the ratios of said second group being spaced apart an amount greater than the spacing of the ratios in the first group, comprising:

independent first and second fluid pressure operated means for shifting said first and second groups, respectively, selector valve means for controlling the shifting of the gear sets in said first and second groups, said selector valve means including means for changing the gear set engaged in said second group when said first group has been moved through a predetermined number of its available ratios and means for thereafter repeating said number of ratios of said first group;

a detector unit including selectable means for simulating the speeds of the respective gear sets of said first group, said selector valve means including means for selecting the corresponding simulating means in said detector unit simultaneously with the selection of the gear set next to be engaged in said first group, said detecting unit including means for giving a shifting signal when the next gear set to be engaged in said first group is in a nonsynchronous condition but is approaching and close to synchronization on either an upshift or a downshift;

inhibitor means associated with the shifting means for said second group and connected to said detecting unit so that operation of said signaling means is prevented until said second group has reached its desired position;

preselect means for actuating said selector valve and thereby positioning same for the next shifting operation;

shift means for placing said first group in neutral;

means responsive to said first group reaching neutral for actuating the shifting means for said second group, whereupon completion of the shifting, if any, in said second group will cause said inhibitor structure to permit operation of said signaling means and the giving of a signal by said signaling means will effect a shift of the first group into next shifted position.

References Cited in the file of this patent
UNITED STATES PATENTS

| | | |
|---|---|---|
| 2,637,221 | Backus et al. | May 5, 1953 |
| 2,932,988 | Flynn et al. | Apr. 19, 1960 |
| 2,943,502 | Perkins et al. | July 5, 1960 |
| 2,943,719 | McNamara et al. | July 5, 1960 |
| 3,103,826 | Jaeschke | Sept. 17, 1963 |